United States Patent
Cao et al.

(10) Patent No.: US 10,483,856 B2
(45) Date of Patent: *Nov. 19, 2019

(54) SYSTEMS AND METHODS WITH PREDICTION MECHANISMS FOR SYNCHRONIZATION RECTIFIER CONTROLLERS

(71) Applicant: ON-BRIGHT ELECTRONICS (SHANGHAI) CO., LTD., Shanghai (CN)

(72) Inventors: Yaming Cao, Shanghai (CN); Qiang Luo, Shanghai (CN); Lieyi Fang, Shanghai (CN)

(73) Assignee: On-Bright Electronics (Shanghai) Co., Ltd., Shanghai (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/685,382

(22) Filed: Aug. 24, 2017

(65) Prior Publication Data

US 2018/0034377 A1 Feb. 1, 2018

Related U.S. Application Data

(63) Continuation of application No. 15/184,827, filed on Jun. 16, 2016, now Pat. No. 9,787,198.

(30) Foreign Application Priority Data

May 23, 2016 (CN) .......................... 2016 1 0345719

(51) Int. Cl.
*H02M 3/335* (2006.01)
*H02M 1/44* (2007.01)

(52) U.S. Cl.
CPC ......... *H02M 3/33515* (2013.01); *H02M 1/44* (2013.01); *H02M 3/33592* (2013.01); *Y02B 70/1475* (2013.01)

(58) Field of Classification Search
CPC . H02M 1/44; H02M 3/33515; H02M 3/33592
See application file for complete search history.

(56) References Cited

U.S. PATENT DOCUMENTS 6,069,804 A 5/2000 Ingman et al.
6,091,233 A 7/2000 Hwang et al.
(Continued)

FOREIGN PATENT DOCUMENTS

CN 2529442 Y 1/2003
CN 101106333 A 1/2008
(Continued)

OTHER PUBLICATIONS

United States Patent and Trademark Office, Notice of Allowance dated Mar. 19, 2018, in U.S. Appl. No. 14/542,443.
(Continued)

*Primary Examiner* — Jeffrey A Gblende
*Assistant Examiner* — Bart Iliya
(74) *Attorney, Agent, or Firm* — Faegre Baker Daniels LLP

(57) ABSTRACT

System controller and method for regulating a power converter. For example, the system controller includes a first controller terminal and a second controller terminal. The system controller is configured to receive, at the first controller terminal, an input signal, generate a drive signal based at least in part on the input signal, and output, at the second controller terminal, the drive signal to a switch to affect a current associated with a secondary winding of the power converter. The system controller is further configured to detect a first duration of a demagnetization period associated with the secondary winding based at least in part on the input signal, determine a second duration of a time period for the drive signal based at least in part on the first
(Continued)

duration, and keep the drive signal at a first logic level during the entire time period.

40 Claims, 6 Drawing Sheets

(56) References Cited

U.S. PATENT DOCUMENTS

| | | | |
|---|---|---|---|
| 6,198,638 B1 | 3/2001 | Lee | |
| 6,972,969 B1 | 12/2005 | Shteynberg et al. | |
| 7,173,835 B1 | 2/2007 | Yang | |
| 7,447,049 B2 | 11/2008 | Garner et al. | |
| 7,768,801 B2 | 8/2010 | Usui et al. | |
| 7,791,903 B2 | 9/2010 | Zhang et al. | |
| 7,826,237 B2 | 11/2010 | Zhang et al. | |
| 7,952,894 B2 | 5/2011 | Lin et al. | |
| 8,102,676 B2 | 1/2012 | Huynh et al. | |
| 8,134,851 B2 | 3/2012 | Soldano et al. | |
| 8,391,028 B2 | 3/2013 | Yeh | |
| 8,542,507 B2 | 9/2013 | Hsu et al. | |
| 8,570,772 B2 | 10/2013 | Morris et al. | |
| 8,953,342 B2 | 2/2015 | Fang | |
| 9,413,246 B2 | 8/2016 | Luo et al. | |
| 9,595,874 B2 | 3/2017 | Cao et al. | |
| 9,602,006 B2* | 3/2017 | Fahlenkamp | H02M 3/33507 |
| 9,787,198 B1 | 10/2017 | Cao et al. | |
| 10,063,153 B2 | 8/2018 | Fang | |
| 10,122,284 B2 | 11/2018 | Fang | |
| 10,148,189 B2 | 12/2018 | Cao et al. | |
| 10,193,451 B2 | 1/2019 | Luo et al. | |
| 2002/0114172 A1* | 8/2002 | Webb | B41J 2/465 363/16 |
| 2004/0125621 A1 | 7/2004 | Yang et al. | |
| 2005/0024897 A1 | 2/2005 | Yang et al. | |
| 2006/0018135 A1 | 1/2006 | Yang et al. | |
| 2007/0139095 A1 | 6/2007 | Fang et al. | |
| 2008/0037302 A1 | 2/2008 | Yang et al. | |
| 2009/0168464 A1 | 7/2009 | Lin et al. | |
| 2009/0257644 A1 | 10/2009 | Dodzin et al. | |
| 2009/0322300 A1 | 12/2009 | Melanson et al. | |
| 2010/0219802 A1 | 9/2010 | Lin et al. | |
| 2011/0002145 A1 | 1/2011 | Halberstadt | |
| 2011/0169463 A1 | 7/2011 | Yang et al. | |
| 2011/0305055 A1 | 12/2011 | Hsu et al. | |
| 2012/0032708 A1* | 2/2012 | Coleman | H02M 3/158 327/109 |
| 2013/0033236 A1 | 2/2013 | Li et al. | |
| 2013/0235620 A1 | 9/2013 | Morris et al. | |
| 2013/0258723 A1 | 10/2013 | Fang et al. | |
| 2013/0272036 A1 | 10/2013 | Fang | |
| 2014/0021786 A1 | 1/2014 | Fang | |
| 2014/0218976 A1 | 8/2014 | Luo et al. | |
| 2015/0070944 A1 | 3/2015 | Fang | |
| 2015/0229223 A1* | 8/2015 | Cao | H02M 3/33515 363/21.13 |
| 2015/0280584 A1* | 10/2015 | Gong | H02M 3/33515 363/21.13 |
| 2016/0149499 A1 | 5/2016 | Fang | |
| 2016/0322909 A1 | 11/2016 | Cao et al. | |
| 2017/0005578 A1 | 1/2017 | Luo et al. | |
| 2017/0126138 A1 | 5/2017 | Cao et al. | |
| 2018/0013352 A1 | 1/2018 | Cao et al. | |
| 2018/0076720 A1 | 3/2018 | Cao et al. | |
| 2018/0248488 A1 | 8/2018 | Cao et al. | |
| 2019/0068073 A1 | 2/2019 | Cao et al. | |

FOREIGN PATENT DOCUMENTS

| | | |
|---|---|---|
| CN | 101188384 A | 5/2008 |
| CN | 101378232 A | 3/2009 |
| CN | 102017376 A | 4/2011 |
| CN | 102104338 A | 6/2011 |
| CN | 102217181 | 10/2011 |
| CN | 102231605 A | 11/2011 |
| CN | 102647074 A | 8/2012 |
| CN | 102723856 A | 10/2012 |
| CN | 102790531 A | 11/2012 |
| CN | 103296867 A | 9/2013 |
| CN | 103728572 A | 4/2014 |
| CN | 103887980 A | 6/2014 |
| CN | 102185501 B | 9/2014 |
| CN | 104393763 A | 3/2015 |
| CN | 103378751 A | 4/2015 |
| CN | 105322800 A | 2/2016 |
| CN | 106026703 A | 5/2016 |
| EP | 2525480 A1 | 11/2012 |
| JP | 2000-014136 A | 1/2000 |
| JP | 2007-28894 A | 2/2007 |
| JP | 2009-261042 A | 11/2009 |
| JP | 2009278717 A | 11/2009 |
| TW | I 366335 | 6/2012 |
| TW | 201234854 A | 8/2012 |
| TW | I 401866 | 7/2013 |
| TW | I 436571 | 5/2014 |
| TW | 201521347 | 6/2015 |
| TW | I 489751 | 6/2015 |
| TW | 201537882 | 10/2015 |
| TW | I 509971 | 11/2015 |
| TW | 201707361 | 2/2017 |

OTHER PUBLICATIONS

United States Patent and Trademark Office, Notice of Allowance dated Mar. 21, 2018, in U.S. Appl. No. 14/957,436.

United States Patent and Trademark Office, Notice of Allowance dated Jun. 6, 2018, in U.S. Appl. No. 15/461,283.

United States Patent and Trademark Office, Notice of Allowance dated Jun. 15, 2018, in U.S. Appl. No. 15/200,948.

Beijing East IP Ltd., Statement attached with a Mailing List, submitted to the State Intellectual Property Office of China on Apr. 29, 2015, and resubmittd to the State Intellectual Property Office of China on Nov. 18, 2015, requesting correction of the filing date for Chinese Patent Application No. 201210118202.7.

State Intellectual Property Office of China, Formal Letter of Examination dated Dec. 2, 2015, in Application No. 201210118202.7.

State Intellectual Property Office of China, print-out of bibligraphic data from http://cpquery.sipo.gov.cn of Chinese Patent Application No. 201210118202.7, dated Feb. 25, 2016.

Chinese Patent Office, Office Action dated Jan. 26, 2014, in Application No. 201210118202.7.

Chinese Patent Office, Office Action dated Oct. 28, 2015, in Application No. 201410093010.4.

Chinese Patent Office, Office Action dated May 25, 2016, in Application No. 201410729533.3.

Chinese Patent Office, Office Action dated Dec. 20, 2017, in Application No. 201610345719.8.

Li, Longwen, "Newest Switch Power Supply Design Procedures and Steps," Chapter 8, Section 4, pp. 455-458, 2008.

Liu, Shengli, "Practical New Technology of High Frequency Switch Power Supply," Chapter 6, pp. 100-117, 2006.

Taiwan Intellectual Property Office, Office Action dated Oct. 9, 2014, in Application No. 101118860.

Taiwan Intellectual Property Office, Office Action dated Dec. 2, 2016, in Application No. 104101330.

Taiwan Intellectual Property Office, Office Action dated May 4, 2017, in Application No. 105122491.

Taiwan Intellectual Property Office, Office Action dated Dec. 27, 2017, in Application No. 106111598.

United States Patent and Trademark Office, Office Action dated Apr. 24, 2017, in U.S. Appl. No. 14/542,443.

United States Patent and Trademark Office, Office Action dated Nov. 28, 2016, in U.S. Appl. No. 14/542,443.

United States Patent and Trademark Office, Office Action dated May 10, 2016, in U.S. Appl. No. 14/542,443.

United States Patent and Trademark Office, Office Action dated Dec. 3, 2015, in U.S. Appl. No. 14/542,443.

United States Patent and Trademark Office, Office Action dated Jun. 9, 2015, in U.S. Appl. No. 14/542,443.

(56) References Cited

OTHER PUBLICATIONS

United States Patent and Trademark Office, Notice of Allowance dated Sep. 13, 2017, in U.S. Appl. No. 14/542,443.
United States Patent and Trademark Office, Notice of Allowance dated Jan. 17, 2018, in U.S. Appl. No. 14/542,443.
United States Patent and Trademark Office, Office Action dated Sep. 28, 2017, in U.S. Appl. No. 15/204,324.
United States Patent and Trademark Office, Office Action dated Oct. 26, 2016, in U.S. Appl. No. 14/957,436.
United States Patent and Trademark Office, Notice of Allowance dated May 9, 2017, in U.S. Appl. No. 14/957,436.
United States Patent and Trademark Office, Notice of Allowance dated Sep. 13, 2017, in U.S. Appl. No. 14/957,436.
United States Patent and Trademark Office, Notice of Allowance dated Dec. 18, 2017, in U.S. Appl. No. 14/957,436.
United States Patent and Trademark Office, Office Action dated Apr. 11, 2017, in U.S. Appl. No. 15/200,948.
United States Patent and Trademark Office, Office Action dated Dec. 12, 2017, in U.S. Appl. No. 15/200,948.
United States Patent and Trademark Office, Office Action dated Oct. 3, 2017, in U.S. Appl. No. 15/353,426.
Chinese Patent Office, Office Action dated Sep. 4, 2018, in Application No. 201710102817.3.
Chinese Patent Office, Office Action dated Nov. 9, 2018, in Application No. 201710534527.6.
Taiwan Intellectual Property Office, Office Action dated Oct. 24, 2018, in Application No. 106140199.
United States Patent and Trademark Office, Notice of Allowance dated Apr. 29, 2019, in U.S. Appl. No. 15/204,324.
United States Patent and Trademark Office, Office Action dated Sep. 24, 2018, in U.S. Appl. No. 15/353,426.
United States Patent and Trademark Office, Notice of Allowance dated Feb. 21, 2019, in U.S. Appl. No. 15/353,426.
United States Patent and Trademark Office, Office Action dated Dec. 10, 2018, in U.S. Appl. No. 16/117,698.
United States Patent and Trademark Office, Office Action dated Jun. 27, 2019, in U.S. Appl. No. 15/665,264.
United States Patent and Trademark Office, Office Action dated Jun. 24, 2019, in U.S. Appl. No. 15/719,283.
United States Patent and Trademark Office, Notice of Allowance dated Jun. 7, 2019, in U.S. Appl. No. 16/117,698.
United States Patent and Trademark Office, Office Action dated Jul. 31, 2019, in U.S. Appl. No. 16/117,698.

\* cited by examiner

SYSTEMS AND METHODS WITH PREDICTION MECHANISMS FOR SYNCHRONIZATION RECTIFIER CONTROLLERS

1. CROSS-REFERENCES TO RELATED APPLICATIONS

This application is a continuation of U.S. patent application Ser. No. 15/184,827, filed Jun. 16, 2016, which claims priority to Chinese Patent Application No. 201610345719.8, filed May 23, 2016, both of the above-referenced applications being incorporated by reference herein for all purposes.

2. BACKGROUND OF THE INVENTION

Certain embodiments of the present invention are directed to integrated circuits. More particularly, some embodiments of the invention provide systems and methods with prediction mechanisms for synchronization rectifier controllers. Merely by way of example, some embodiments of the invention have been applied to power converters operating under continuous conduction mode. But it would be recognized that the invention has a much broader range of applicability.

Conventional secondary-side synchronization rectifier (SR) controllers often are used as parts of power conversion systems. These conventional power conversion systems usually need to support multiple modes of operation. The modes of operation include discontinuous conduction mode (DCM), quasi-resonant mode (QR) and continuous conduction mode (CCM).

FIG. 1 is a simplified diagram showing a conventional flyback power conversion system with a conventional secondary-side synchronization rectifier (SR) controller. The power conversion system 100 (e.g., a power converter) includes an electromagnetic interference (EMI) filter 101, a rectifying bridge 102, capacitors 103 and 107, resistors 105 and 106, a diode 109, a primary winding 112, a secondary winding 114, a primary-side pulse-width-modulation (PWM) controller 120, a secondary-side synchronization rectifier (SR) controller 130, a primary-side switch 142 (e.g., a transistor), a secondary-side switch 144 (e.g., a transistor), an output resistive load 152, and an output capacitive load 154.

The primary-side PWM controller 120 generates a drive signal 121. The drive signal 121 is received by the switch 142 (e.g., a transistor) and is used to close or open the switch 142 (e.g., to turn on or off a transistor) to affect a current 141 flowing through the primary winding 112. Additionally, the secondary-side SR controller 130 includes controller terminals 138 and 139. The secondary-side SR controller 130 receives, at the controller terminal 138, a signal 131 (e.g., $V_d$) from the drain terminal of the transistor 144 (e.g., a MOSFET transistor), generates a drive signal 137 (e.g., $V_g$), and outputs, at the controller terminal 139, the drive signal 137 to the transistor 144. The drive signal 137 is received by the gate terminal of the transistor 144 and is used to turn on or off the transistor 144 to affect a current 146 flowing through the secondary winding 114.

As shown in FIG. 1, the secondary-side SR controller 130 includes a drain-voltage detector 132, a logic controller 134, and a gate driver 136. The drain-voltage detector 132 receives the signal 131 (e.g., $V_d$) from the drain terminal of the transistor 144, detects the received signal 131, and generates a detection signal 133. The detection signal 133 is received by the logic controller 134, which in response generates a control signal 135. The gate driver 136 receives the control signal 135 and outputs the drive signal 137 (e.g., $V_g$) to the gate terminal of the transistor 144. The drive signal 137 (e.g., $V_g$) is generated based at least in part on the detected signal 131 (e.g., $V_d$), and is used to turn on or off the transistor 144. If the drive signal 137 is at a logic high level, the transistor 144 is turned on, and if the drive signal 137 is at a logic low level, the transistor 144 is turned off.

FIG. 2 is a simplified diagram showing certain conventional components of the secondary-side synchronization rectifier controller 130 of the power conversion system 100. The drain-voltage detector 132 includes comparators 210 and 220. The comparator 210 receives the signal 131 (e.g., $V_d$) and a threshold signal 212 (e.g., $V_{th\_on}$) and generates a comparison signal 214. The comparator 220 receives the signal 131 (e.g., $V_d$) and a threshold signal 222 (e.g., $V_{th\_off}$) and generates a comparison signal 224. The detection signal 133 includes comparison signals 214 and 224.

As shown in FIGS. 1 and 2, when the power conversion system 100 operates under the DCM mode or the QR mode, the drive signal 137 changes from the logic low level to the logic high level and the transistor 144 changes from being turned off to being turned on, if the detected signal 131 (e.g., $V_d$) drops below the threshold signal 212 (e.g., $V_{th\_on}$) and the comparison signal 214 changes from the logic low level to the logic high level. Also, when the power conversion system 100 operates under the DCM mode or the QR mode, the drive signal 137 changes from the logic high level to the logic low level and the transistor 144 changes from being turned on to being turned off, if the detected signal 131 (e.g., $V_d$) rises above the threshold signal 222 (e.g., $V_{th\_off}$) and the comparison signal 224 changes from the logic high level to the logic low level.

For example, the threshold signal 222 (e.g., $V_{th\_off}$) is close to 0 V (e.g., being equal to −15 mV), so the detected signal 131 (e.g., $V_d$) rises above the threshold signal 222 (e.g., $V_{th\_off}$) and the comparison signal 224 changes from the logic high level to the logic low level at the end of the demagnetization period when a secondary current 116 that flows through the secondary winding 114 becomes sufficiently small in magnitude. In another example, when the power conversion system 100 operates under the DCM mode or the QR mode, the transistor 144 becomes turned off before the transistor 142 becomes turned on.

However, the conventional power conversion systems with secondary-side synchronization rectifier controllers can experience significantly reliability issues. Hence it is highly desirable to improve the techniques related to secondary-side synchronization rectifier controllers.

3. BRIEF SUMMARY OF THE INVENTION

Certain embodiments of the present invention are directed to integrated circuits. More particularly, some embodiments of the invention provide systems and methods with prediction mechanisms for synchronization rectifier controllers. Merely by way of example, some embodiments of the invention have been applied to power converters operating under continuous conduction mode. But it would be recognized that the invention has a much broader range of applicability.

According to one embodiment, a system controller for regulating a power converter includes a first controller terminal and a second controller terminal. The system controller is configured to receive, at the first controller terminal, an input signal, generate a drive signal based at least in part on the input signal, and output, at the second controller terminal, the drive signal to a switch to affect a current associated with a secondary winding of the power converter. The system controller is further configured to detect a first duration of a demagnetization period associated with the secondary winding based at least in part on the input signal, determine a second duration of a time period for the drive signal based at least in part on the first duration, and keep the drive signal at a first logic level during the entire time period to keep the switch closed during the entire time period. The demagnetization period includes a first beginning and a first end, and the time period includes a second beginning and a second end. The second end is after the first end.

According to another embodiment, a system controller for regulating a power converter includes a first controller terminal and a second controller terminal. The system controller is configured to receive, at the first controller terminal, an input signal, generate a first drive signal based at least in part on the input signal, and output, at the second controller terminal, the first drive signal to a first switch to affect a first current associated with a secondary winding of the power converter. The system controller is further configured to detect a first duration of a first time period for a second drive signal based at least in part on the input signal, detect a demagnetization duration of a demagnetization period associated with the secondary winding based at least in part on the input signal, detect a second duration of a second time period for the second drive signal based at least in part on the input signal, determine a third duration of a third time period for the first drive signal based at least in part on the first duration, the demagnetization duration, and the second duration, and keep the first drive signal at a first logic level during the entire third time period to keep the first switch closed during the entire third time period. The second drive signal is outputted to a second switch to affect a second current associated with a primary winding of the power converter. The primary winding is coupled to the secondary winding. The first time period includes a first beginning and a first end, the demagnetization period includes a second beginning and a second end, the second time period includes a third beginning and a third end, and the third time period includes a fourth beginning and a fourth end. The fourth end is after the first end, the second end, and the third end. The second switch is closed from the first beginning to the first end, the second switch is open from the first end to the third beginning, and the second switch is closed from the third beginning to the third end.

According to yet another embodiment, a method for regulating a power converter includes receiving an input signal, generating a drive signal based at least in part on the input signal, and outputting the drive signal to a switch to affect a current associated with a secondary winding of the power converter. The generating a drive signal based at least in part on the input signal includes detecting a first duration of a demagnetization period associated with the secondary winding based at least in part on the input signal, determining a second duration of a time period for the drive signal based at least in part on the first duration, and keeping the drive signal at a first logic level during the entire time period to keep the switch closed during the entire time period. The demagnetization period includes a first beginning and a first end, and the time period includes a second beginning and a second end. The second end is after the first end.

According to yet another embodiment, a method for regulating a power converter includes receiving an input signal, generating a first drive signal based at least in part on the input signal, and outputting the first drive signal to a first switch to affect a first current associated with a secondary winding of the power converter. The generating a first drive signal based at least in part on the input signal includes detecting a first duration of a first time period for a second drive signal based at least in part on the input signal, detecting a demagnetization duration of a demagnetization period associated with the secondary winding based at least in part on the input signal, detecting a second duration of a second time period for the second drive signal based at least in part on the input signal, determining a third duration of a third time period for the first drive signal based at least in part on the first duration, the demagnetization duration, and the second duration, and keeping the first drive signal at a first logic level during the entire third time period to keep the first switch closed during the entire third time period. The second drive signal is outputted to a second switch to affect a second current associated with a primary winding of the power converter. The first time period includes a first beginning and a first end, and the demagnetization period includes a second beginning and a second end. The second time period includes a third beginning and a third end, and the third time period includes a fourth beginning and a fourth end. The fourth end is after the first end, the second end, and the third end. The second switch is closed from the first beginning to the first end, the second switch is open from the first end to the third beginning, and the second switch is closed from the third beginning to the third end.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide systems and methods with prediction mechanisms for synchronization rectifier controllers. Merely by way of example, some embodiments of the invention have been applied to power converters operating under continuous conduction mode. But it would be recognized that the invention has a much broader range of applicability.

Figure 1:
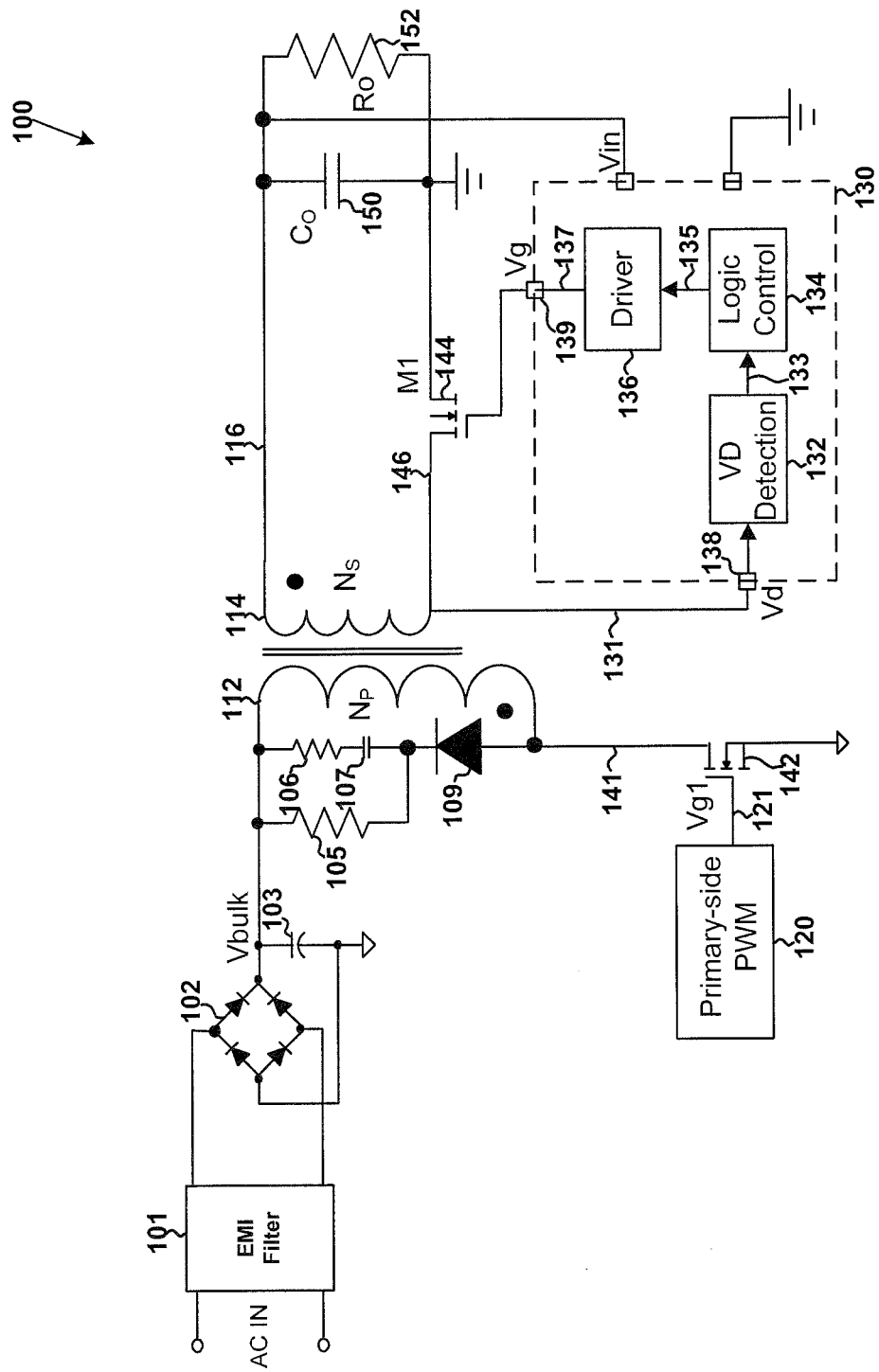
FIG. 1 is a simplified diagram showing a conventional flyback power conversion system with a conventional secondary-side synchronization rectifier (SR) controller.
Figure 2:
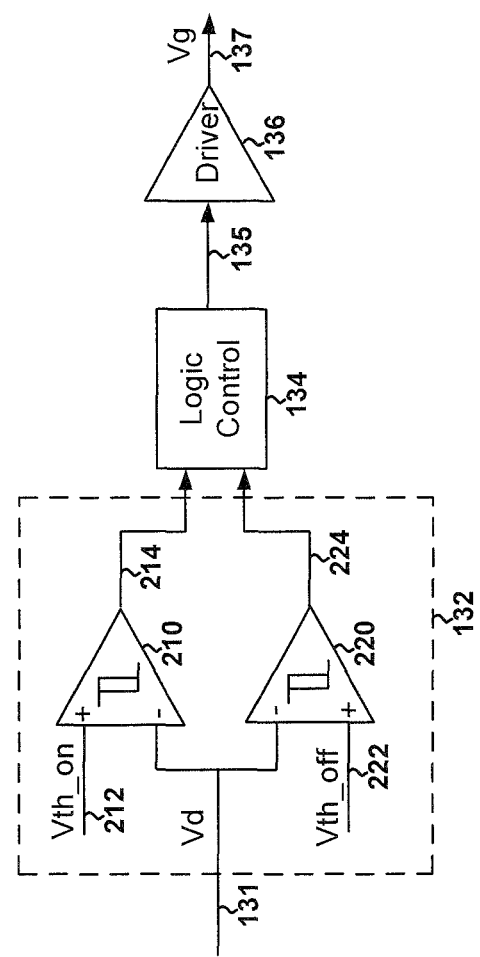
FIG. 2 is a simplified diagram showing certain conventional components of the secondary-side synchronization rectifier controller of the power conversion system as shown in FIG. 1.

Referring to FIGS. 1 and 2, if the threshold signal 222 (e.g., $V_{th\_off}$) is close to 0 V (e.g., being equal to −15 mV), when the power conversion system 100 operates under the CCM mode, the secondary current 116 often does not become sufficiently small in magnitude at the end of the demagnetization period, so the detected signal 131 (e.g., $V_d$) usually cannot rise above the threshold signal 222 and the comparison signal 224 often cannot change from the logic high level to the logic low level at the end of the demagnetization period; therefore, the transistor 144 does not become turned off before the transistor 142 becomes turned on, according to certain embodiments. For example, if the power conversion system 100 operates under the CCM mode, the secondary current 116 does not become sufficiently small in magnitude and the detected signal 131 (e.g., $V_d$) does not rise above the threshold signal 222 until after the transistor 142 becomes turned on. In another example, if the power conversion system 100 operates under the CCM mode, the transistor 144 remains turned on when the transistor 142 becomes turned on, and shoot-through of the transformer that includes the primary winding 112 and the secondary winding 114 damages the power conversion system 100 causes reliability concern.

Figure 3:
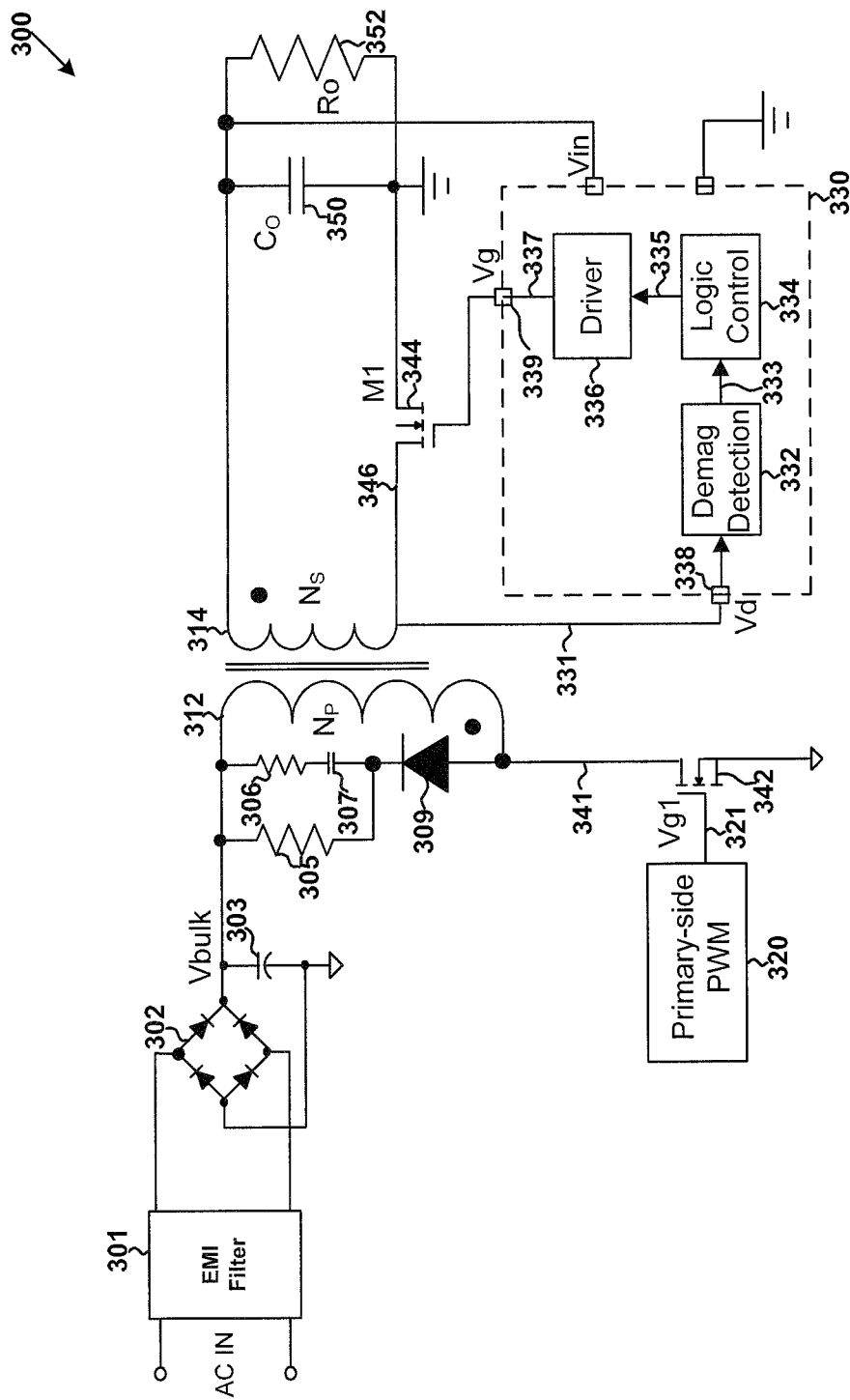
FIG. 3 is a simplified diagram showing a power conversion system with a synchronization rectifier (SR) controller according to an embodiment of the present invention.

FIG. 3 is a simplified diagram showing a power conversion system with a synchronization rectifier (SR) controller according to an embodiment of the present invention. This diagram is merely an example, which should not unduly limit the scope of the claims. One of ordinary skill in the art would recognize many variations, alternatives, and modifications. The power conversion system 300 (e.g., a power converter) includes an electromagnetic interference (EMI) filter 301, a rectifying bridge 302, capacitors 303 and 307, resistors 305 and 306, a diode 309, a primary winding 312, a secondary winding 314, a pulse-width-modulation (PWM) controller 320, a synchronization rectifier (SR) controller 330, a switch 342 (e.g., a transistor), a switch 344 (e.g., a transistor), an output resistive load 352, and an output capacitive load 354. For example, the pulse-width-modulation (PWM) controller 320 is on the primary side, and the SR controller 330 is on the secondary side. In another example, the switch 342 (e.g., a transistor) is on the primary side, and the switch 344 (e.g., a transistor) is on the secondary side.

In one embodiment, the PWM controller 320 generates a drive signal 321 and outputs the drive signal 321 to the switch 342. For example, the drive signal 321 is received by the switch 342 (e.g., a transistor) and is used to close or open the switch 342 (e.g., to turn on or off a transistor) to affect a current 341 associated with (e.g., flowing through) the primary winding 312. In another embodiment, the SR controller 330 includes controller terminals 338 and 339. For example, the SR controller 330 receives, at the controller terminal 338, a signal 331 (e.g., $V_d$) from the drain terminal of the transistor 344 (e.g., a MOSFET transistor), generates a drive signal 337 (e.g., $V_g$), and outputs, at the controller terminal 339, the drive signal 337 to the transistor 344. In another example, the drive signal 337 is received by the gate terminal of the transistor 344 and is used to turn on or off the transistor 344 to affect a current 346 associated with (e.g., flowing through) the secondary winding 314. In yet another embodiment, if the power conversion system 300 operates under the CCM mode, the transistor 344 becomes turned off before the switch 342 becomes closed (e.g., turned on), and the transistor 344 remains turned off when the transistor 342 is closed (e.g., turned on).

As shown in FIG. 3, the SR controller 330 includes a demagnetization detector 332, a logic controller 334, and a gate driver 336 according to certain embodiments. In one embodiment, the demagnetization detector 332 receives the signal 331 (e.g., $V_d$) from the drain terminal of the transistor 344 and generates a demagnetization signal 333. For example, the signal 331 is the drain voltage of the drain terminal of the transistor 344. In another example, the demagnetization signal 333 is at a logic high level during demagnetization periods, and is at a logic low level outside demagnetization periods.

In another embodiment, the demagnetization signal 333 is received by the logic controller 334, which in response generates a control signal 335. For example, the control signal 335 includes one or more pulses. In yet another embodiment, the gate driver 336 receives the control signal 335 and outputs the drive signal 337 (e.g., $V_g$) to the gate terminal of the transistor 344. For example, if the drive signal 337 is at a logic high level, the transistor 344 is turned on, and if the drive signal 337 is at a logic low level, the transistor 344 is turned off.

Figure 4:
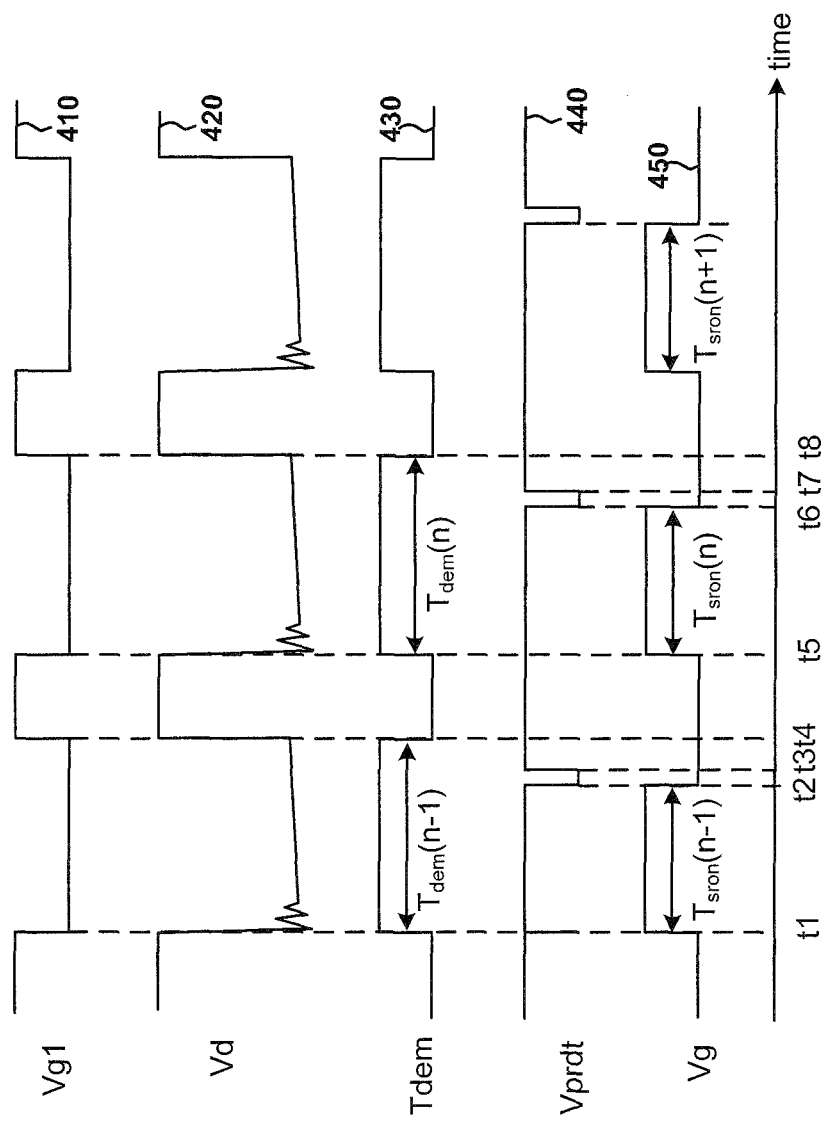
FIG. 4 is a simplified timing diagram for the power conversion system as shown in FIG. 3 that operates under continuous conduction mode (CCM) according to an embodiment of the present invention.

FIG. 4 is a simplified timing diagram for the power conversion system 300 that operates under continuous conduction mode (CCM) according to an embodiment of the present invention. This diagram is merely an example, which should not unduly limit the scope of the claims. One of ordinary skill in the art would recognize many variations, alternatives, and modifications. The waveform 410 represents the drive signal 321 as a function of time, the waveform 420 represents the signal 331 as a function of time, the waveform 430 represents the demagnetization signal 333 as a function of time, the waveform 440 represents the control signal 335 as a function of time, and the waveform 450 represents the drive signal 337 as a function of time. For example, the power conversion system 300 operates under the CCM mode with stable switching but without subharmonic oscillation.

In one embodiment, at time $t_1$, the drive signal 321 changes from the logic high level to the logic low level (e.g., as shown by the waveform 410), and the switch 342 becomes open (e.g., turned off). For example, at the time $t_1$, the signal 331 starts decreasing rapidly (e.g., as shown by the waveform 420). In another example, at the time $t_1$, the demagnetization signal 333 changes from the logic low level to the logic high level (e.g., as shown by the waveform 430), indicating the beginning of a demagnetization period (e.g., $T_{dem}(n-1)$, n being an integer larger than 1). In yet another example, at the time $t_1$, the drive signal 337 changes from the logic low level to the logic high level (e.g., as shown by the waveform 450) and the transistor 344 becomes turned on, indicating the beginning of an on-time period (e.g., $T_{sron}(n-1)$, n being an integer larger than 1).

In another embodiment, at time $t_2$, the control signal 335 changes from the logic high level to the logic low level (e.g., as shown by the waveform 440), which causes the drive signal 337 to change from the logic high level to the logic low level (e.g., as shown by the waveform 450). For example, the time $t_2$ represents the end of the on-time period (e.g., $T_{sron}(n-1)$, n being an integer larger than 1). In yet another embodiment, at time $t_3$, the control signal 335 changes from the logic low level to the logic high level (e.g., as shown by the waveform 440), indicating the end of a pulse (e.g., from the time $t_2$ to the time $t_3$).

In yet another embodiment, at time $t_4$, the demagnetization signal 333 changes from the logic high level to the logic low level (e.g., as shown by the waveform 430), indicating the end of the demagnetization period (e.g., $T_{dem}(n-1)$, n being an integer larger than 1). For example, at the time $t_4$, the drive signal 321 changes from the logic low level to the logic high level (e.g., as shown by the waveform 410), and the switch 342 becomes closed (e.g., turned on). In another example, at the time $t_4$, the signal 331 starts increasing rapidly (e.g., as shown by the waveform 420).

According to one embodiment, at time $t_5$, the drive signal 321 changes from the logic high level to the logic low level (e.g., as shown by the waveform 410), and the switch 342 becomes open (e.g., turned off). For example, at the time $t_5$, the signal 331 starts decreasing rapidly (e.g., as shown by the waveform 420). In another example, at the time $t_5$, the demagnetization signal 333 changes from the logic low level to the logic high level (e.g., as shown by the waveform 430), indicating the beginning of a demagnetization period (e.g., $T_{dem}(n)$, n being an integer larger than 1). In yet another example, at the time $t_5$, the drive signal 337 changes from the logic low level to the logic high level (e.g., as shown by the waveform 450) and the transistor 344 becomes turned on, indicating the beginning of an on-time period (e.g., $T_{sron}(n)$, n being an integer larger than 1).

According to another embodiment, at time $t_6$, the control signal 335 changes from the logic high level to the logic low level (e.g., as shown by the waveform 440), which causes the drive signal 337 to change from the logic high level to the logic low level (e.g., as shown by the waveform 450). For example, the time $t_6$ represents the end of the on-time period (e.g., $T_{sron}(n)$, n being an integer larger than 1).

In another example, the time $t_6$ is determined so that:

$$T_{sron}(n) = k \times T_{dem}(n-1) \quad \text{(Equation 1)}$$

where $T_{sron}(n)$ represents an on-time period from time $t_5$ to time $t_6$. Additionally, $T_{dem}(n-1)$ represents a demagnetization period from time $t_1$ to time $t_4$, which ends before the beginning of the on-time period $T_{sron}(n)$ (e.g., as shown by the waveforms 430 and 450). Moreover, k is a predetermined prediction coefficient larger than zero but smaller than 1. Also, n is an integer larger than 1.

According to yet another embodiment, at time $t_7$, the control signal 335 changes from the logic low level to the logic high level (e.g., as shown by the waveform 440), indicating the end of a pulse (e.g., from the time $t_6$ to the time $t_7$). According to yet another embodiment, at time $t_8$, the demagnetization signal 333 changes from the logic high level to the logic low level (e.g., as shown by the waveform 430), indicating the end of the demagnetization period (e.g., $T_{dem}(n)$, n being an integer larger than 1). In another example, at the time $t_8$, the drive signal 321 changes from the logic low level to the logic high level (e.g., as shown by the waveform 410), and the switch 342 becomes closed (e.g., turned on). In yet another example, at the time $t_8$, the signal 331 starts increasing rapidly (e.g., as shown by the waveform 420).

According to certain embodiments, as shown in FIGS. 3 and 4, the SR controller 330 receives the signal 331, determines the duration of demagnetization period $T_{dem}(m)$ based at least in part on the signal 331, and uses the duration of the demagnetization period $T_{dem}(m)$ to predicate the duration of on-time period $T_{sron}(m+1)$ as follows:

$$T_{sron}(m+1) = k \times T_{dem}(m) \quad \text{(Equation 2)}$$

where m is an integer larger than 0. Additionally, $T_{sron}(m+1)$ represents an on-time period of the drive signal 337, and $T_{dem}(m)$ represents a demagnetization period that ends before the beginning of the on-time period $T_{sron}(m+1)$ (e.g., as shown by the waveforms 430 and 450). Moreover, k is a predetermined prediction coefficient larger than zero but smaller than 1. For example, according to Equation 2, the SR controller 330 determines a time (e.g., time $t_6$) for generating a falling edge of the control signal 335 (e.g., as shown by the waveform 440). In another example, the falling edge of the control signal 335 causes the drive signal 337 to change from the logic high level to the logic low level (e.g., as shown by the waveform 450), indicating the end of an on-time period of the drive signal 337 (e.g., indicating the time $t_6$ as the end of $T_{sron}(n)$).

In one embodiment, when m is equal to n−1, Equation 2 becomes Equation 1, where n is an integer larger than 1. In another embodiment, when m is equal to n, Equation 2 becomes Equation 3 as follows:

$$T_{sron}(n+1) = k \times T_{dem}(n) \quad \text{(Equation 3)}$$

where n is an integer larger than 1. Additionally, $T_{sron}(n+1)$ represents an on-time period of the drive signal 337, and $T_{dem}(n)$ represents a demagnetization period that ends before the beginning of the on-time period $T_{sron}(n+1)$. Moreover, k is the predetermined prediction coefficient that appears in Equation 2. For example, the SR controller 330 receives the signal 331 (e.g., as shown by the waveform 420), determines the duration of demagnetization period $T_{dem}(n)$ based at least in part on the signal 331 (e.g., as shown by the waveform 430), and uses the duration of the demagnetization period $T_{dem}(n)$ to predict the duration of on-time period $T_{sron}(n+1)$ according to Equation 3.

According to some embodiments, if the power conversion system 300 operates under the CCM mode (e.g., with stable switching but without sub-harmonic oscillation), the transistor 344 becomes turned off before the switch 342 becomes closed (e.g., as shown by the waveforms 410 and 450), so that shoot-through of the transformer that includes the primary winding 312 and the secondary winding 314 can be prevented.

Figure 5:
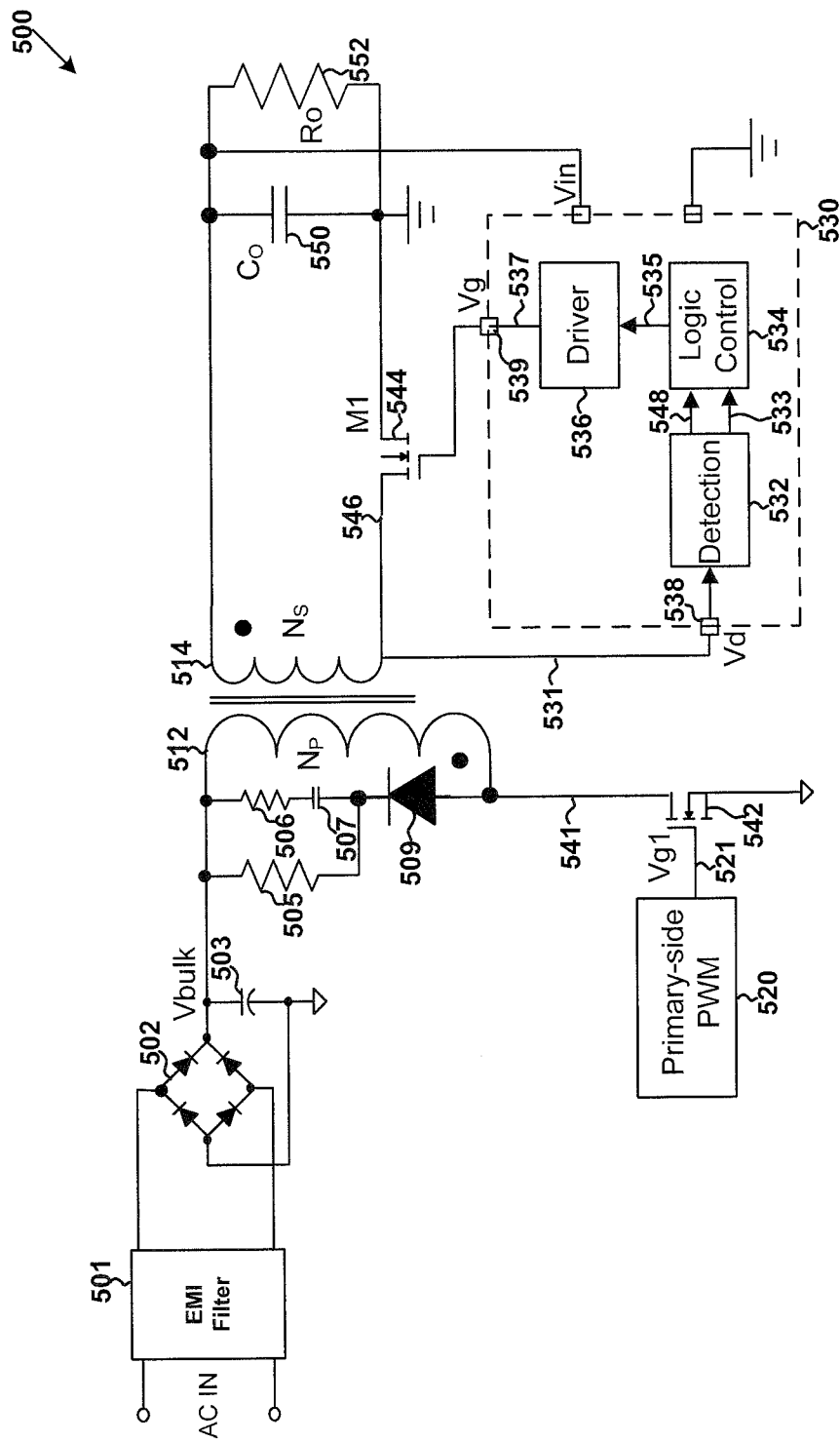
FIG. 5 is a simplified diagram showing a power conversion system with a synchronization rectifier (SR) controller according to another embodiment of the present invention.

FIG. 5 is a simplified diagram showing a power conversion system with a synchronization rectifier (SR) controller according to another embodiment of the present invention. This diagram is merely an example, which should not unduly limit the scope of the claims. One of ordinary skill in the art would recognize many variations, alternatives, and modifications. The power conversion system 500 (e.g., a power converter) includes an electromagnetic interference (EMI) filter 501, a rectifying bridge 502, capacitors 503 and 507, resistors 505 and 506, a diode 509, a primary winding 512, a secondary winding 514, a pulse-width-modulation (PWM) controller 520, a synchronization rectifier (SR) controller 530, a switch 542 (e.g., a transistor), a switch 544 (e.g., a transistor), an output resistive load 552, and an output capacitive load 554. For example, the pulse-width-modulation (PWM) controller 520 is on the primary side, and the SR controller 530 is on the secondary side. In another example, the switch 542 (e.g., a transistor) is on the primary side, and the switch 544 (e.g., a transistor) is on the secondary side.

In one embodiment, the PWM controller 520 generates a drive signal 521 and outputs the drive signal 521 to the switch 542. For example, the drive signal 521 is received by the switch 542 (e.g., a transistor) and is used to close or open the switch 542 (e.g., to turn on or off a transistor) to affect a current 541 associated with (e.g., flowing through) the primary winding 512. In another embodiment, the SR controller 530 includes controller terminals 538 and 539. For example, the SR controller 530 receives, at the controller terminal 538, a signal 531 (e.g., $V_d$) from the drain terminal of the transistor 544 (e.g., a MOSFET transistor), generates a drive signal 537 (e.g., $V_g$), and outputs, at the controller terminal 539, the drive signal 537 to the transistor 544. In another example, the drive signal 537 is received by the gate terminal of the transistor 544 and is used to turn on or off the transistor 544 to affect a current 546 associated with (e.g., flowing through) the secondary winding 514. In yet another embodiment, if the power conversion system 500 operates under the CCM mode, the transistor 544 becomes turned off before the switch 542 becomes closed (e.g., turned on), and the transistor 544 remains turned off when the transistor 342 is closed (e.g., turned on).

As shown in FIG. 5, the SR controller 530 includes a detector 532, a logic controller 534, and a gate driver 536 according to certain embodiments. According to certain embodiments, the detector 532 receives the signal 531 (e.g., $V_d$) from the drain terminal of the transistor 544 and generates a demagnetization signal 533 and an on-time signal 548. For example, the signal 531 is the drain voltage of the drain terminal of the transistor 544.

In one embodiment, the detector 532 receives the signal 531 (e.g., $V_d$), detects demagnetization periods for the secondary winding 514, generates the demagnetization signal 533 based at least in part on the signal 531, and outputs the demagnetization signal 533 to the logic controller 534. For example, the demagnetization signal 533 is at a logic high level during demagnetization periods, and is at a logic low level outside demagnetization periods.

In another embodiment, the detector 532 receives the signal 531 (e.g., $V_d$) from the drain terminal of the transistor 544, detects whether the drive signal 521 is in the on-state (e.g., at the logic high level) or in the off-state (e.g., at the logic low level) based at least in part on the signal 531, generates the on-time signal 548 based at least in part on the signal 531, and outputs the on-time signal 548 to the logic controller 534. For example, the on-time signal 548 is at a logic high level during on-time periods of the drive signal 521, and is at a logic low level outside on-time periods of the drive signal 521. In yet another example, the on-time signal 548 is at a logic high level if the switch 542 is closed (e.g., turned on), and is at a logic low level if the switch 542 is open (e.g., turned off).

In yet another embodiment, the demagnetization signal 533 and the on-time signal 548 are received by the logic controller 534, which in response generates a control signal 535. For example, the control signal 535 includes one or more pulses. In yet another embodiment, the gate driver 536 receives the control signal 535 and outputs the drive signal 537 (e.g., $V_g$) to the gate terminal of the transistor 544. For example, if the drive signal 537 is at a logic high level, the transistor 544 is turned on, and if the drive signal 537 is at a logic low level, the transistor 544 is turned off.

Figure 6:
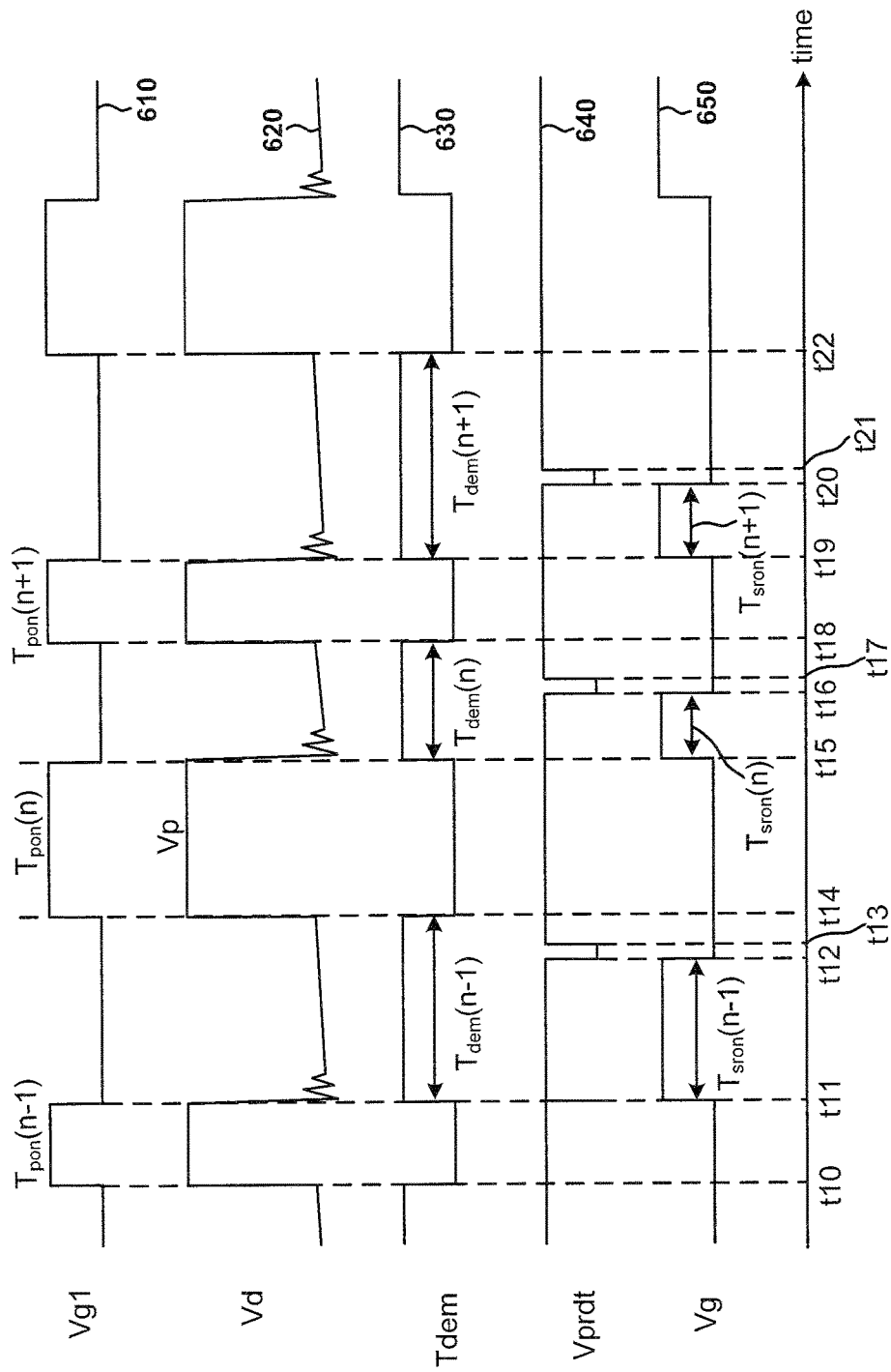
FIG. 6 is a simplified timing diagram for the power conversion system as shown in FIG. 5 that operates under continuous conduction mode (CCM) according to an embodiment of the present invention.

FIG. 6 is a simplified timing diagram for the power conversion system 500 that operates under continuous conduction mode (CCM) according to an embodiment of the present invention. This diagram is merely an example, which should not unduly limit the scope of the claims. One of ordinary skill in the art would recognize many variations, alternatives, and modifications. The waveform 610 represents the drive signal 521 as a function of time, the waveform 620 represents the signal 531 as a function of time, the waveform 630 represents the demagnetization signal 533 as a function of time, the waveform 640 represents the control signal 535 as a function of time, and the waveform 550 represents the drive signal 537 as a function of time. For example, the power conversion system 500 operates under the CCM mode with sub-harmonic oscillations but also with constant switching periods for the drive signal 521.

In one embodiment, at time $t_{10}$, the demagnetization signal 533 changes from the logic high level to the logic low level (e.g., as shown by the waveform 630), indicating the end of a demagnetization period. For example, at time $t_{10}$, the drive signal 521 changes from the logic low level to the logic high level (e.g., as shown by the waveform 610), and the switch 542 becomes closed (e.g., turned on), indicating the beginning of an on-time period of the drive signal 521 (e.g., $T_{pon}(n-1)$, n being an integer larger than 1). In another example, at the time $t_{10}$, the signal 331 starts increasing rapidly (e.g., as shown by the waveform 620).

In another embodiment, at time $t_{11}$, the drive signal 521 changes from the logic high level to the logic low level (e.g., as shown by the waveform 610), and the switch 521 becomes open (e.g., turned off), indicating the end of the on-time period of the drive signal 521 (e.g., $T_{pon}$ (n-1), n being an integer larger than 1). For example, the time $t_{11}$ represents the end of the on-time period $T_{pon}(n-1)$ of the drive signal 521, which is from the time $t_{10}$ to the time $t_{11}$, where n is an integer larger than 1. In another example, at the time $t_{11}$, the signal 531 starts decreasing rapidly (e.g., as shown by the waveform 620). In yet another example, at the time $t_{11}$, the demagnetization signal 533 changes from the logic low level to the logic high level (e.g., as shown by the waveform 630), indicating the beginning of a demagnetization period (e.g., $T_{dem}(n-1)$, n being an integer larger than 1). In yet another example, at the time $t_{11}$, the drive signal 537 changes from the logic low level to the logic high level (e.g., as shown by the waveform 650) and the transistor 544 becomes turned on, indicating the beginning of an on-time period of the drive signal 537 (e.g., $T_{sron}(n-1)$, n being an integer larger than 1).

In another embodiment, at time $t_{12}$, the control signal 535 changes from the logic high level to the logic low level (e.g., as shown by the waveform 640), which causes the drive signal 537 to change from the logic high level to the logic low level (e.g., as shown by the waveform 650). For example, the time $t_{12}$ represents the end of the on-time period of the drive signal 537 (e.g., $T_{sron}(n-1)$, n being an integer larger than 1). In yet another embodiment, at time $t_{13}$, the control signal 535 changes from the logic low level to the logic high level (e.g., as shown by the waveform 640), indicating the end of a pulse (e.g., from the time $t_{12}$ to the time $t_{13}$).

In yet another embodiment, at time $t_{14}$, the demagnetization signal 533 changes from the logic high level to the logic low level (e.g., as shown by the waveform 630), indicating the end of the demagnetization period (e.g., $T_{dem}(n-1)$, n being an integer larger than 1). For example, at time $t_{14}$, the drive signal 521 changes from the logic low level to the logic high level (e.g., as shown by the waveform 610), and the switch 521 becomes closed (e.g., turned on), indicating the beginning of an on-time period of the drive signal 521 (e.g., $T_{pon}(n)$, n being an integer larger than 1). In another example, at the time $t_{14}$, the drive signal 521 changes from the logic low level to the logic high level (e.g., as shown by the waveform 610), and the switch 542 becomes closed (e.g., turned on). In yet another example, at the time $t_{14}$, the signal 531 starts increasing rapidly (e.g., as shown by the waveform 620).

According to one embodiment, at time $t_{15}$, the drive signal 521 changes from the logic high level to the logic low level (e.g., as shown by the waveform 610), and the switch 542 becomes open (e.g., turned off), indicating the end of the on-time period of the drive signal 521 (e.g., $T_{pon}(n)$, n being an integer larger than 1). For example, the time $t_{15}$ represents the end of the on-time period $T_{pon}(n)$ of the drive signal 521, which is from the time $t_{14}$ to the time $t_{15}$, where n is an integer larger than 1. In another example, at the time $t_{15}$, the signal 531 starts decreasing rapidly (e.g., as shown by the waveform 620). In another example, at the time $t_{15}$, the demagnetization signal 533 changes from the logic low level to the logic high level (e.g., as shown by the waveform 630), indicating the beginning of a demagnetization period (e.g., $T_{dem}(n)$, n being an integer larger than 1). In yet another example, at the time $t_{15}$, the drive signal 537 changes from the logic low level to the logic high level (e.g., as shown by the waveform 650) and the transistor 544 becomes turned on, indicating the beginning of an on-time period of the drive signal 537 (e.g., $T_{sron}(n)$, n being an integer larger than 1).

According to another embodiment, at time $t_{16}$, the control signal 535 changes from the logic high level to the logic low level (e.g., as shown by the waveform 640), which causes the drive signal 537 to change from the logic high level to the logic low level (e.g., as shown by the waveform 650). For example, the time $t_{16}$ represents the end of the on-time period of the drive signal 537 (e.g., $T_{sron}(n)$, n being an integer larger than 1).

In another example, $$T_{pon}(n) - T_{pon}(n-1) \geq T_{th} \quad \text{(Equation 4)}$$

so the time $t_{16}$ is determined as follows:

$$T_{sron}(n) = j_1 \times T_{dem}(n-1) \quad \text{(Equation 5)}$$

where $T_{pon}(n-1)$ represents an on-time period of the drive signal 521 from time $t_{10}$ to time $t_{11}$, and $T_{pon}(n)$ represents another on-time period of the drive signal 521 from time $t_{14}$ to time $t_{15}$. Additionally, $T_{th}$ represents a predetermined time threshold. For example, $T_{th}$ is larger than zero. Moreover, n is an integer larger than 1. Also, $T_{sron}(n)$ represents an on-time period of the drive signal 537 from time $t_{15}$ to time $t_{16}$. Additionally, $T_{dem}(n-1)$ represents a demagnetization period from time $t_{11}$ to time $t_{14}$, which ends before the beginning of the on-time period $T_{sron}(n)$ (e.g., as shown by the waveforms 630 and 650). Moreover, $j_1$ is a predetermined prediction coefficient. For example, $j_1$ is larger than zero but smaller than 1. In another example, $j_1$ is larger than zero but smaller than or equal to 0.5.

According to yet another embodiment, at time $t_{17}$, the control signal 535 changes from the logic low level to the logic high level (e.g., as shown by the waveform 640), indicating the end of a pulse (e.g., from the time $t_{16}$ to the time $t_{17}$). According to yet another embodiment, at time $t_{18}$, the demagnetization signal 533 changes from the logic high level to the logic low level (e.g., as shown by the waveform 630), indicating the end of the demagnetization period (e.g., $T_{dem}(n)$, n being an integer larger than 1). In another example, at the time $t_{18}$, the drive signal 521 changes from the logic low level to the logic high level (e.g., as shown by the waveform 610), and the switch 542 becomes closed (e.g., turned on), indicating the beginning of an on-time period of the drive signal 521 (e.g., $T_{pon}(n+1)$, n being an integer larger than 1). In yet another example, at the time $t_{18}$, the signal 531 starts increasing rapidly (e.g., as shown by the waveform 620).

In one embodiment, at time $t_{19}$, the drive signal 521 changes from the logic high level to the logic low level (e.g., as shown by the waveform 610), and the switch 542 becomes open (e.g., turned off), indicating the end of the on-time period of the drive signal 521 (e.g., $T_{pon}(n+1)$, n being an integer larger than 1). For example, the time $t_{19}$ represents the end of the on-time period $T_{pon}(n+1)$ of the drive signal 521, which is from the time $t_{18}$ to the time $t_{19}$, where n is an integer larger than 1. In another example, at the time $t_{19}$, the signal 531 starts decreasing rapidly (e.g., as shown by the waveform 620). In another example, at the time $t_{19}$, the demagnetization signal 533 changes from the logic low level to the logic high level (e.g., as shown by the waveform 630), indicating the beginning of a demagnetization period (e.g., $T_{dem}(n+1)$, n being an integer larger than 1). In yet another example, at the time $t_{19}$, the drive signal 537 changes from the logic low level to the logic high level (e.g., as shown by the waveform 650) and the transistor 544 becomes turned on, indicating the beginning of an on-time period of the drive signal 537 (e.g., $T_{sron}(n+1)$, n being an integer larger than 1).

In another embodiment, at time $t_{20}$, the control signal 535 changes from the logic high level to the logic low level (e.g., as shown by the waveform 640), which causes the drive signal 537 to change from the logic high level to the logic low level (e.g., as shown by the waveform 650). For example, the time $t_{20}$ represents the end of the on-time period of the drive signal 537 (e.g., $T_{sron}(n+1)$, n being an integer larger than 1).

In another example, $$T_{pon}(n+1) - T_{pon}(n) < T_{th} \quad \text{(Equation 6)}$$

so the time $t_{16}$ is determined as follows:

$$T_{sron}(n+1) = j_2 \times T_{dem}(n) \quad \text{(Equation 7)}$$

where $T_{pon}(n)$ represents an on-time period of the drive signal 521 from time $t_{14}$ to time $t_{15}$, and $T_{pon}(n+1)$ represents another on-time period of the drive signal 521 from time $t_{18}$ to time $t_{19}$. Additionally, $T_{th}$ represents the predetermined time threshold that also appears in Equation 4. Moreover, n is an integer larger than 1. Also, $T_{sron}(n+1)$ represents an on-time period of the drive signal 537 from time $t_{19}$ to time $t_{20}$. Additionally, $T_{dem}(n)$ represents a demagnetization period from time $t_{15}$ to time $t_{18}$, which ends before the beginning of the on-time period $T_{sron}(n+1)$ (e.g., as shown by the waveforms 630 and 650). Moreover, $j_2$ is a predetermined prediction coefficient. For example, $j_2$ is larger than zero but smaller than 1. In another example, $j_2$ is larger than 0.5 but smaller than 1. In yet another example, $j_2$ is not equal to $j_1$ that appears in Equation 5. In yet another example, $j_2$ is larger than $j_1$ that appears in Equation 5.

According to yet another embodiment, at time $t_{21}$, the control signal 535 changes from the logic low level to the logic high level (e.g., as shown by the waveform 640), indicating the end of a pulse (e.g., from the time $t_{20}$ to the time $t_{21}$). According to yet another embodiment, at time $t_{22}$, the demagnetization signal 533 changes from the logic high level to the logic low level (e.g., as shown by the waveform 630), indicating the end of the demagnetization period (e.g., $T_{dem}(n+1)$, n being an integer larger than 1). In another example, at the time $t_{22}$, the drive signal 521 changes from the logic low level to the logic high level (e.g., as shown by the waveform 610), and the switch 542 becomes closed (e.g., turned on), indicating the beginning of an on-time period of the drive signal 521. In yet another example, at the time $t_{22}$, the signal 531 starts increasing rapidly (e.g., as shown by the waveform 620).

According to certain embodiments, as shown in FIGS. 5 and 6, the SR controller 530 receives the signal 531, determines the duration of on-time period $T_{pon}(m)$ of the drive signal 521 based at least in part on the signal 531, determines the duration of demagnetization period $T_{dem}(m)$ based at least in part on the signal 531, determines the duration of on-time period $T_{pon}(m+1)$ of the drive signal 521 based at least in part on the signal 531, and uses the duration of on-time period $T_{pon}(m)$, the duration of demagnetization period $T_{dem}(m)$ and the duration of on-time period $T_{pon}(m+1)$ to predicate the duration of on-time period $T_{sron}(m+1)$ as follows:

If $T_{pon}(m+1) - T_{pon}(m) \geq T_h$ \hfill (Equation 8)

$T_{sron}(m+1) = j_1 \times T_{dem}(m)$ \hfill (Equation 9)

If $T_{pon}(m+1) - T_{pon}(m) < T_{th}$ \hfill (Equation 10)

$T_{sron}(m+1) = j_2 \times T_{dem}(m)$ \hfill (Equation 11)

where m is an integer larger than 0. Additionally, $T_{pon}(m)$ represents an on-time period of the drive signal 521, and $T_{pon}(m+1)$ represents another on-time period of the drive signal 521. Additionally, $T_{th}$ represents a predetermined time threshold. For example, $T_{th}$ is larger than zero. Moreover, $T_{sron}(m+1)$ represents an on-time period of the drive signal 537. Also, $T_{dem}(m)$ represents a demagnetization period that ends before the beginning of the on-time period $T_{sron}(m+1)$ (e.g., as shown by the waveforms 630 and 650). Additionally, $j_1$ is a predetermined prediction coefficient, and $j_2$ is also a predetermined prediction coefficient. For example, $j_1$ is larger than zero but smaller than 1, and $j_2$ is larger than zero but smaller than 1. In another example, $j_1$ and $j_2$ are not equal. In yet another example, $j_2$ is larger than $j_1$. In yet another example, $j_1$ is larger than zero but smaller than or equal to 0.5, and $j_2$ is larger than 0.5 but smaller than 1.

In one embodiment, m is equal to n−1, where n is an integer larger than 1. For example, when m is equal to n−1, Equation 8 is satisfied, so the duration of on-time period $T_{sron}(m+1)$ is predicated according to Equation 9, as shown by Equations 4 and 5. In another embodiment, m is equal to n, where n is an integer larger than 1. For example, when m is equal to n, Equation 10 is satisfied, so the duration of on-time period $T_{sron}(m+1)$ is predicated according to Equation 11, as shown by Equations 6 and 7.

According to some embodiments, if the power conversion system 500 operates under the CCM mode (e.g., with sub-harmonic oscillations but also with constant switching periods for the drive signal 521), the transistor 544 becomes turned off before the switch 342 becomes closed (e.g., as shown by the waveforms 610 and 650), so that shoot-through of the transformer that includes the primary winding 512 and the secondary winding 514 can be prevented (e.g., even if the sub-harmonic oscillations cause significant variations in demagnetization periods).

Certain embodiments of the present invention have various advantages. For example, the power conversion system (e.g., the power conversion system 300 and/or the power conversion system 500) uses a synchronization rectifier (SR) controller (e.g., the SR controller 330 and/or the SR controller 530) to prevent shoot-through of the transformer when the power conversion system operates under the CCM mode. In another example, the synchronization rectifier (SR) controller (e.g., the SR controller 330 and/or the SR controller 530) can improve reliability and efficiency of the power conversion system (e.g., the power conversion system 300 and/or the power conversion system 500).

According to another embodiment, a system controller (e.g., the synchronization rectifier controller 330) for regulating a power converter (e.g., the power converter 300) includes a first controller terminal (e.g., the terminal 338) and a second controller terminal (e.g., the terminal 339). The system controller (e.g., the synchronization rectifier controller 330) is configured to receive, at the first controller terminal (e.g., the terminal 338), an input signal (e.g., the signal 331), generate a drive signal (e.g., the signal 337) based at least in part on the input signal, and output, at the second controller terminal (e.g., the terminal 339), the drive signal (e.g., the signal 337) to a switch (e.g., the switch 344) to affect a current (e.g., the current 346) associated with a secondary winding (e.g., the secondary winding 314) of the power converter (e.g., the power converter 300). The system controller (e.g., the synchronization rectifier controller 330) is further configured to detect a first duration of a demagnetization period (e.g., $T_{dem}(n-1)$ as shown in FIG. 4) associated with the secondary winding (e.g., the secondary winding 314) based at least in part on the input signal, determine a second duration of a time period (e.g., $T_{sron}(n)$ as shown in FIG. 4) for the drive signal (e.g., the signal 337) based at least in part on the first duration, and keep the drive signal (e.g., the signal 337) at a first logic level during the entire time period (e.g., during the entire $T_{sron}(n)$ as shown in FIG. 4) to keep the switch (e.g., the switch 344) closed during the entire time period (e.g., during the entire $T_{sron}(n)$ as shown in FIG. 4). The demagnetization period (e.g., $T_{dem}(n-1)$ as shown in FIG. 4) includes a first beginning (e.g., $t_1$ as shown in FIG. 4) and a first end (e.g., $t_4$ as shown in FIG. 4), and the time period (e.g., $T_{sron}(n)$ as shown in FIG. 4) includes a second beginning (e.g., $t_5$ as shown in FIG. 4) and a second end (e.g., $t_6$ as shown in FIG. 4). The second end (e.g., $t_6$ as shown in FIG. 4) is after the first end (e.g., $t_4$ as shown in FIG. 4). For example, the system controller (e.g., the synchronization rectifier controller 330) is implemented according to at least FIG. 3 and/or FIG. 4.

In another example, the system controller (e.g., the synchronization rectifier controller 330) is further configured to determine the second duration of the time period (e.g., $T_{sron}(n)$ as shown in FIG. 4) to be equal to the first duration (e.g., the duration of $T_{dem}(n-1)$ as shown in FIG. 4) multiplied by a predetermined coefficient (e.g., as shown by Equation 1 and/or Equation 2). The predetermined coefficient (e.g., k as shown in Equation 1 and/or k as shown in Equation 2) is larger than 0 and smaller than 1. In yet another example, the second beginning (e.g., $t_5$ as shown in FIG. 4) is after the first end (e.g., $t_4$ as shown in FIG. 4). In yet another example, the system controller (e.g., the synchronization rectifier controller 330) is further configured to keep the drive signal (e.g., the signal 337) at a second logic level from the first end (e.g., $t_4$ as shown in FIG. 4) to the second beginning (e.g., $t_5$ as shown in FIG. 4) to keep the switch (e.g., the switch 344) open from the first end to the second beginning. In yet another example, the first logic level is a logic high level, and the second logic level is a logic low level.

In yet another example, the switch (e.g., the switch 344) includes a transistor, and the transistor includes a gate terminal, a drain terminal, and a source terminal. In yet another example, the system controller (e.g., the synchronization rectifier controller 330) is further configured to receive, at the first controller terminal (e.g., the terminal 338) the input signal from the drain terminal of the transistor, and output, at the second controller terminal (e.g., the terminal 339), the drive signal (e.g., the signal 337) to the gate terminal of the transistor to turn on or off the transistor (e.g., the transistor 344) to affect the current (e.g., the current 346) flowing through the secondary winding of the power converter. In yet another example, the input signal (e.g., the signal 331) is a voltage signal representing a drain voltage of the drain terminal (e.g., the drain voltage of the transistor 344).

In yet another example, the system controller (e.g., the synchronization rectifier controller 330) further includes a demagnetization detector (e.g., the demagnetization detector 332) configured to receive the input signal (e.g., the signal 331) and generate a demagnetization signal (e.g., the signal 333) based at least in part on the input signal, a logic controller (e.g., the logic controller 334) configured to receive the demagnetization signal and generate a control signal (e.g., the signal 335) based at least in part on the demagnetization signal, and a driver (e.g., the gate driver 336) configured to receive the control signal and generate the drive signal (e.g., the signal 337) based at least in part on the control signal. The demagnetization signal (e.g., the signal 333) indicates the first beginning (e.g., $t_1$ as shown in FIG. 4) of the demagnetization period (e.g., $T_{dem}(n-1)$ as shown in FIG. 4) and the first end (e.g., $t_4$ as shown in FIG. 4) of the demagnetization period. The control signal (e.g., the signal 335) indicates the second end (e.g., $t_6$ as shown in FIG. 4) of the time period (e.g., $T_{sron}(n)$ as shown in FIG. 4) (e.g., as shown by the waveform 440 in FIG. 4).

According to yet another embodiment, a system controller (e.g., the synchronization rectifier controller 530) for regulating a power converter (e.g., the power converter 500) includes a first controller terminal (e.g., the terminal 538) and a second controller terminal (e.g., the terminal 539). The system controller (e.g., the synchronization rectifier controller 530) is configured to receive, at the first controller terminal (e.g., the terminal 538), an input signal (e.g., the signal 531), generate a first drive signal (e.g., the signal 537) based at least in part on the input signal, and output, at the second controller terminal (e.g., the terminal 539), the first drive signal (e.g., the signal 537) to a first switch (e.g., the switch 544) to affect a first current (e.g., the current 546) associated with a secondary winding (e.g., the secondary winding 514) of the power converter (e.g., the power converter 500). The system controller (e.g., the synchronization rectifier controller 530) is further configured to detect a first duration of a first time period (e.g., $T_{pon}(n-1)$ or $T_{pon}(n)$ as shown in FIG. 6) for a second drive signal (e.g., the signal 521) based at least in part on the input signal (e.g., the signal 531), detect a demagnetization duration of a demagnetization period (e.g., $T_{dem}(n-1)$ or $T_{dem}(n)$ as shown in FIG. 6) associated with the secondary winding (e.g., the secondary winding 514) based at least in part on the input signal, detect a second duration of a second time period (e.g., $T_{pon}(n)$ or $T_{pon}(n+1)$ as shown in FIG. 6) for the second drive signal (e.g., the signal 521) based at least in part on the input signal (e.g., the signal 531), determine a third duration of a third time period (e.g., $T_{sron}(n)$ or $T_{sron}(n+1)$ as shown in FIG. 6) for the first drive signal (e.g., the signal 537) based at least in part on the first duration, the demagnetization duration, and the second duration, and keep the first drive signal (e.g., the signal 544) at a first logic level during the entire third time period (e.g., during the entire $T_{sron}(n)$ or during the entire $T_{sron}(n+1)$ as shown in FIG. 6) to keep the first switch (e.g., the switch 544) closed during the entire third time period (e.g., during the entire $T_{sron}(n)$ or during the entire $T_{sron}(n+1)$ as shown in FIG. 6). The second drive signal (e.g., the signal 521) is outputted to a second switch (e.g., the switch 542) to affect a second current (e.g., the current 541) associated with (e.g., flowing through) a primary winding (e.g., the primary winding 512) of the power converter (e.g., the power converter 500). The primary winding (e.g., the primary winding 512) is coupled to the secondary winding (e.g., the secondary winding 514). The first time period (e.g., $T_{pon}(n-1)$ as shown in FIG. 6) includes a first beginning (e.g., $t_{10}$ as shown in FIG. 6) and a first end (e.g., $t_{11}$ as shown in FIG. 6), the demagnetization period (e.g., $T_{dem}(n-1)$ as shown in FIG. 6) includes a second beginning (e.g., $t_{11}$ as shown in FIG. 6) and a second end (e.g., $t_{14}$ as shown in FIG. 6), the second time period (e.g., $T_{pon}(n)$ as shown in FIG. 6) includes a third beginning (e.g., $t_{14}$ as shown in FIG. 6) and a third end (e.g., $t_{15}$ as shown in FIG. 6), and the third time period (e.g., $T_{sron}(n)$ as shown in FIG. 6) includes a fourth beginning (e.g., $t_{15}$ as shown in FIG. 6) and a fourth end (e.g., $t_{16}$ as shown in FIG. 6). The fourth end (e.g., $t_{16}$ as shown in FIG. 6) is after the first end (e.g., $t_{11}$ as shown in FIG. 6), the second end (e.g., $t_{14}$ as shown in FIG. 6), and the third end (e.g., $t_{15}$ as shown in FIG. 6). The second switch (e.g., the switch 542) is closed from the first beginning (e.g., $t_{10}$ as shown in FIG. 6) to the first end (e.g., $t_{11}$ as shown in FIG. 6), the second switch (e.g., the switch 542) is open from the first end (e.g., $t_{11}$ as shown in FIG. 6) to the third beginning (e.g., $t_{14}$ as shown in FIG. 6), and the second switch (e.g., the switch 542) is closed from the third beginning (e.g., $t_{14}$ as shown in FIG. 6) to the third end (e.g., $t_{15}$ as shown in FIG. 6). For example, the system controller (e.g., the synchronization rectifier controller 530) is implemented according to at least FIG. 5 and/or FIG. 6.

In another example, the system controller (e.g., the synchronization rectifier controller 530) is further configured to determine whether the first duration and the second duration satisfy one or more predetermined conditions (e.g., as shown by Equation 4, Equation 6, Equation 8, and/or Equation 10), and determine the third duration of the third time period based at least in part on whether the first duration and the second duration satisfy the one or more predetermined conditions (e.g., as shown by Equation 5, Equation 7, Equation 9, and/or Equation 11). In yet another example, the system controller the system controller (e.g., the synchronization rectifier controller 530) is further configured to, if the second duration minus the first duration is larger than a predetermined threshold (e.g., as shown by Equation 4 and/or Equation 8), determine the first duration and the second duration satisfy the one or more predetermined conditions. In yet another embodiment, the system controller (e.g., the synchronization rectifier controller 530) is further configured to, if the second duration minus the first duration is smaller than the predetermined threshold (e.g., as shown by Equation 6 and/or Equation 10), determine the first duration and the second duration do not satisfy the one or more predetermined conditions.

In yet another example, the system controller (e.g., the synchronization rectifier controller 530) is further configured to, if the first duration and the second duration are determined to satisfy the one or more predetermined conditions, determine the third duration to be equal to the demagnetization duration multiplied by a first predetermined coefficient (e.g., as shown by Equation 5 and/or Equation 9). The first predetermined coefficient (e.g., $j_1$ as shown in Equation 5 and/or $j_1$ as shown in Equation 9) is larger than 0 and smaller than 1. In yet another example, the system controller (e.g., the synchronization rectifier controller 530) is further configured to, if the first duration and the second duration are determined not to satisfy the one or more predetermined conditions, determine the third duration to be equal to the demagnetization duration multiplied by a second predetermined coefficient (e.g., as shown by Equation 5 and/or Equation 9). The second predetermined coefficient is larger than 0 and smaller than 1 (e.g., $j_2$ as shown in Equation 7 and/or $j_2$ as shown in Equation 11), and the second predetermined coefficient (e.g., $j_2$ as shown in Equation 7 and/or $j_2$ as shown in Equation 11) is not equal to the first predetermined coefficient (e.g., $j_1$ as shown in Equation 5 and/or $j_1$ as shown in Equation 9). In yet another example, the predetermined threshold (e.g., $T_{th}$ as shown in Equation 4, Equation 6, Equation 8, and/or Equation 10) is larger than 0, and the second predetermined coefficient (e.g., $j_2$ as shown in Equation 7 and/or $j_2$ as shown in Equation 11) is larger than the first predetermined coefficient (e.g., $j_1$ as shown in Equation 5 and/or $j_1$ as shown in Equation 9). In yet another example, the first predetermined coefficient (e.g., $j_1$ as shown in Equation 5 and/or $j_1$ as shown in Equation 9) is larger than 0 and smaller than or equal to 0.5, and the second predetermined coefficient (e.g., $j_2$ as shown in Equation 7 and/or $j_2$ as shown in Equation 11) is larger than 0.5 and smaller than to 1.

In yet another example, the system controller (e.g., the synchronization rectifier controller 530) is further configured to keep the first drive signal (e.g., the signal 537) at a second logic level from the second end (e.g., $t_{14}$ as shown in FIG. 6) to the fourth beginning (e.g., $t_{15}$ as shown in FIG. 6) to keep the first switch (e.g., the switch 544) open from the second end to the fourth beginning. In yet another example, the first logic level is a logic high level, and the second logic level is a logic low level.

In yet another example, the first switch (e.g., the switch 544) includes a transistor, and the transistor includes a gate terminal, a drain terminal, and a source terminal. In yet another example, the system controller (e.g., the synchronization rectifier controller 530) is further configured to receive, at the first controller terminal (e.g., the terminal 538), the input signal from the drain terminal of the transistor, and output, at the second controller terminal (e.g., the terminal 539), the first drive signal (e.g., the signal 537) to the gate terminal of the transistor to turn on or off the transistor (e.g., the transistor 544) to affect the first current (e.g., the current 546) flowing through the secondary winding of the power converter. In yet another example, the input signal (e.g., the signal 531) is a voltage signal representing a drain voltage of the drain terminal (e.g., the drain voltage of the transistor 544).

In yet another example, the system controller (e.g., the synchronization rectifier controller 330) further includes a signal detector (e.g., the detector 532) configured to receive the input signal (e.g., the signal 531) and generate a first signal (e.g., the signal 548) and a second signal (e.g., the signal 533) based at least in part on the input signal (e.g., the signal 531), a logic controller configured to receive the first signal and the second signal and generate a control signal (e.g., the signal 535) based at least in part on the first signal and the second signal, and a driver (e.g., the gate driver 536) configured to receive the control signal and generate the first drive signal (e.g., the signal 537) based at least in part on the control signal. The first signal (e.g., the signal 548) indicates the first beginning (e.g., $t_{10}$ as shown in FIG. 6) of the first time period (e.g., $T_{pon}(n-1)$ as shown in FIG. 6), the first end (e.g., $t_{11}$ as shown in FIG. 6) of the first time period (e.g., $T_{pon}(n-1)$ as shown in FIG. 6), the third beginning (e.g., $t_{14}$ as shown in FIG. 6) of the second time period (e.g., $T_{pon}(n)$ as shown in FIG. 6), and the third end (e.g., $t_{15}$ as shown in FIG. 6) of the second time period (e.g., $T_{pon}(n)$ as shown in FIG. 6), and the second signal (e.g., the signal 533) indicates the second beginning (e.g., $t_{11}$ as shown in FIG. 6) of the demagnetization period (e.g., $T_{dem}(n-1)$ as shown in FIG. 6) and the second end (e.g., $t_{14}$ as shown in FIG. 6) of the demagnetization period (e.g., $T_{dem}(n-1)$ as shown in FIG. 6). The control signal (e.g., the signal 535) indicates the fourth end (e.g., $t_{16}$ as shown in FIG. 6) of the third time period (e.g., $T_{sron}(n)$ as shown in FIG. 6) (e.g., as shown by the waveform 640 in FIG. 6).

According to yet another embodiment, a method for regulating a power converter (e.g., the power converter 300) includes receiving an input signal (e.g., the signal 331), generating a drive signal (e.g., the signal 337) based at least in part on the input signal, and outputting the drive signal (e.g., the signal 337) to a switch (e.g., the switch 344) to affect a current (e.g., the secondary winding 314) associated with (e.g., flowing through) a secondary winding (e.g., the secondary winding 314) of the power converter (e.g., the power converter 300). The generating a drive signal based at least in part on the input signal includes detecting a first duration of a demagnetization period (e.g., $T_{dem}(n-1)$ as shown in FIG. 4) associated with the secondary winding (e.g., the secondary winding 314) based at least in part on the input signal, determining a second duration of a time period (e.g., $T_{sron}(n)$ as shown in FIG. 4) for the drive signal (e.g., the signal 337) based at least in part on the first duration, and keeping the drive signal (e.g., the signal 337) at a first logic level during the entire time period (e.g., during the entire $T_{sron}(n)$ as shown in FIG. 4) to keep the switch (e.g., the switch 344) closed during the entire time period (e.g., during the entire $T_{sron}(n)$ as shown in FIG. 4). The demagnetization period (e.g., $T_{dem}(n-1)$ as shown in FIG. 4) includes a first beginning (e.g., $t_1$ as shown in FIG. 4) and a first end (e.g., $t_4$ as shown in FIG. 4), and the time period (e.g., $T_{sron}(n)$ as shown in FIG. 4) includes a second beginning (e.g., $t_5$ as shown in FIG. 4) and a second end (e.g., $t_6$ as shown in FIG. 4). The second end (e.g., $t_6$ as shown in FIG. 4) is after the first end (e.g., $t_4$ as shown in FIG. 4). For example, the method is implemented according to at least FIG. 3 and/or FIG. 4.

According to yet another embodiment, a method for regulating a power converter (e.g., the power converter 500) includes receiving an input signal (e.g., the signal 531), generating a first drive signal (e.g., the signal 537) based at least in part on the input signal, and outputting the first drive signal (e.g., the signal 537) to a first switch (e.g., the switch 544) to affect a first current (e.g., the current 546) associated with (e.g., flowing through) a secondary winding (e.g., the secondary winding 514) of the power converter (e.g., the power converter 500). The generating a first drive signal based at least in part on the input signal includes detecting a first duration of a first time period (e.g., $T_{pon}(n-1)$ or $T_{pon}(n)$ as shown in FIG. 6) for a second drive signal (e.g., the signal 521) based at least in part on the input signal (e.g., the signal 531), detecting a demagnetization duration of a demagnetization period (e.g., $T_{dem}(n-1)$ or $T_{dem}(n)$ as shown in FIG. 6) associated with the secondary winding (e.g., the secondary winding 514) based at least in part on the input signal, detecting a second duration of a second time period (e.g., $T_{pon}(n)$ or $T_{pon}(n+1)$ as shown in FIG. 6) for the second drive signal (e.g., the signal 521) based at least in part on the input signal (e.g., the signal 531), determining a third duration of a third time period (e.g., $T_{sron}(n)$ or $T_{sron}(n+1)$ as shown in FIG. 6) for the first drive signal (e.g., the signal 537) based at least in part on the first duration, the demagnetization duration, and the second duration, and keeping the first drive signal (e.g., the signal 544) at a first logic level during the entire third time period (e.g., during the entire $T_{sron}(n)$ or during the entire $T_{sron}(n+1)$ as shown in FIG. 6) to keep the first switch (e.g., the switch 544) closed during the entire third time period (e.g., during the entire $T_{sron}(n)$ or during the entire $T_{sron}(n+1)$ as shown in FIG. 6). The second drive signal (e.g., the signal 521) is outputted to a second switch (e.g., the switch 542) to affect a second current (e.g., the current 541) associated with (e.g., flowing through) a primary winding (e.g., the primary winding 512) of the power converter (e.g., the power converter 500). The first time period (e.g., $T_{pon}(n-1)$ as shown in FIG.

6) includes a first beginning (e.g., $t_{10}$ as shown in FIG. 6) and a first end (e.g., $t_{11}$ as shown in FIG. 6), and the demagnetization period (e.g., $T_{dem}(n-1)$ as shown in FIG. 6) includes a second beginning (e.g., $t_{11}$ as shown in FIG. 6) and a second end (e.g., $t_{14}$ as shown in FIG. 6). The second time period (e.g., $T_{pon}(n)$ as shown in FIG. 6) includes a third beginning (e.g., $t_{14}$ as shown in FIG. 6) and a third end (e.g., $t_{15}$ as shown in FIG. 6), and the third time period (e.g., $T_{sron}(n)$ as shown in FIG. 6) includes a fourth beginning (e.g., $t_{15}$ as shown in FIG. 6) and a fourth end (e.g., $t_{16}$ as shown in FIG. 6). The fourth end (e.g., $t_{16}$ as shown in FIG. 6) is after the first end (e.g., $t_{11}$ as shown in FIG. 6), the second end (e.g., $t_{14}$ as shown in FIG. 6), and the third end (e.g., $t_{15}$ as shown in FIG. 6). The second switch (e.g., the switch 542) is closed from the first beginning (e.g., $t_{10}$ as shown in FIG. 6) to the first end (e.g., $t_{11}$ as shown in FIG. 6), the second switch (e.g., the switch 542) is open from the first end (e.g., $t_{11}$ as shown in FIG. 6) to the third beginning (e.g., $t_{14}$ as shown in FIG. 6), and the second switch (e.g., the switch 542) is closed from the third beginning (e.g., $t_{14}$ as shown in FIG. 6) to the third end (e.g., $t_{15}$ as shown in FIG. 6). For example, the method is implemented according to at least FIG. 5 and/or FIG. 6.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a power converter, the system controller comprising:
    a first controller terminal; and
    a second controller terminal;
    wherein the first controller terminal is configured to receive an input signal;
    wherein the second controller terminal is configured to output a drive signal to a switch to affect a current associated with a winding of the power converter, the drive signal being associated with the input signal;
    wherein the system controller is configured to:
        detect a first duration of a demagnetization period associated with the winding based at least in part on the input signal, the demagnetization period including a first beginning and a first end; and
        determine a second duration of a time period for the drive signal based at least in part on the first duration, the time period including a second beginning and a second end, the second end being after the first end.

2. The system controller of claim 1 is further configured to determine the second duration of the time period to be equal to the first duration multiplied by a predetermined coefficient, the predetermined coefficient being larger than 0 and smaller than 1.

3. The system controller of claim 1 wherein the second beginning is after the first end.

4. The system controller of claim 3 is further configured to keep the drive signal at a first logic level from the second beginning to the second end and at a second logic level from the first end to the second beginning.

5. The system controller of claim 4 wherein:
    the first logic level is a logic high level; and
    the second logic level is a logic low level.

6. The system controller of claim 1 wherein the switch includes a transistor, the transistor including a gate terminal, a drain terminal, and a source terminal.

7. The system controller of claim 6 wherein:
    the first controller terminal is further configured to receive the input signal from the drain terminal of the transistor; and
    the second controller terminal is further configured to output the drive signal to the gate terminal of the transistor to turn on or off the transistor to affect the current of the power converter.

8. The system controller of claim 7 wherein the input signal is a voltage signal representing a drain voltage of the drain terminal.

9. The system controller of claim 1, and further comprising:
    a demagnetization detector configured to receive the input signal and generate a demagnetization signal based at least in part on the input signal;
    a signal generator configured to receive the demagnetization signal and generate an output signal based at least in part on the demagnetization signal; and
    a driver configured to receive the output signal and generate the drive signal based at least in part on the output signal;
    wherein:
        the demagnetization signal indicates the first beginning of the demagnetization period and the first end of the demagnetization period; and
        the output signal indicates the second end of the time period.

10. A system controller for a power converter, the system controller comprising:
    a first controller terminal; and
    a second controller terminal;
    wherein the first controller terminal is configured to receive an input signal;
    wherein the second controller terminal is configured to output a first drive signal to a first switch to affect a first current associated with a first winding of the power converter, the first drive signal being associated with the input signal;
    wherein the system controller is configured to:
        detect a first duration of a first time period for a second drive signal, the second drive signal being outputted to a second switch to affect a second current associated with a second winding of the power converter, the second winding being coupled to the first winding, the first time period including a first beginning and a first end;
        detect a demagnetization duration of a demagnetization period associated with the first winding, the demagnetization period including a second beginning and a second end;

detect a second duration of a second time period for the second drive signal, the second time period including a third beginning and a third end; and determine a third duration of a third time period for the first drive signal based at least in part on the first duration, the demagnetization duration, and the second duration, the third time period including a fourth beginning and a fourth end, the fourth end being after the first end, the second end, and the third end;

wherein:
the second switch is closed from the first beginning to the first end;
the second switch is open from the first end to the third beginning; and
the second switch is closed from the third beginning to the third end.

11. The system controller of claim 10 is further configured to:
determine whether the first duration and the second duration satisfy one or more predetermined conditions; and
determine the third duration of the third time period based at least in part on whether the first duration and the second duration satisfy the one or more predetermined conditions.

12. The system controller of claim 11 is further configured to, in response to the second duration minus the first duration being larger than a predetermined threshold, determine the first duration and the second duration satisfy the one or more predetermined conditions.

13. The system controller of claim 12 is further configured to, in response to the second duration minus the first duration being smaller than the predetermined threshold, determine the first duration and the second duration do not satisfy the one or more predetermined conditions.

14. The system controller of claim 13 is further configured to:
in response to the first duration and the second duration being determined to satisfy the one or more predetermined conditions, determine the third duration to be equal to the demagnetization duration multiplied by a first predetermined coefficient;
wherein the first predetermined coefficient is larger than 0 and smaller than 1.

15. The system controller of claim 14 is further configured to:
in response to the first duration and the second duration being determined not to satisfy the one or more predetermined conditions, determine the third duration to be equal to the demagnetization duration multiplied by a second predetermined coefficient;
wherein:
the second predetermined coefficient is larger than 0 and smaller than 1; and
the second predetermined coefficient is not equal to the first predetermined coefficient.

16. The system controller of claim 15 wherein:
the predetermined threshold is larger than 0; and
the second predetermined coefficient is larger than the first predetermined coefficient.

17. The system controller of claim 16 wherein:
the first predetermined coefficient is larger than 0 and smaller than or equal to 0.5; and
the second predetermined coefficient is larger than 0.5 and smaller than 1.

18. The system controller of claim 10 wherein:
the first end is at the same time as the second beginning;
the second end is at the same time as the third beginning; and
the third end is at the same time as the fourth beginning.

19. The system controller of claim 10 is further configured to keep the first drive signal at a first logic level from the fourth beginning to the fourth end and at a second logic level from the second end to the fourth beginning.

20. The system controller of claim 19 wherein:
the first logic level is a logic high level; and
the second logic level is a logic low level.

21. The system controller of claim 10 wherein the first switch includes a transistor, the transistor including a gate terminal, a drain terminal, and a source terminal.

22. The system controller of claim 21 wherein:
the first controller terminal is further configured to receive the input signal from the drain terminal of the transistor; and
the second controller terminal is further configured to output the first drive signal to the gate terminal of the transistor to turn on or off the transistor to affect the first current flowing through the first winding of the power converter.

23. The system controller of claim 22 wherein the input signal is a voltage signal representing a drain voltage of the drain terminal.

24. The system controller of claim 10, and further comprising:
a signal detector configured to receive the input signal and generate a first output signal and a second output signal based at least in part on the input signal;
a signal generator configured to receive the first output signal and the second output signal and generate a third output signal based at least in part on the first output signal and the second output signal; and
a driver configured to receive the third output signal and generate the first drive signal based at least in part on the third output signal;
wherein:
the first output signal indicates the first beginning of the first time period, the first end of the first time period, the third beginning of the second time period, and the third end of the second time period;
the second output signal indicates the second beginning of the demagnetization period and the second end of the demagnetization period; and
the third output signal indicates the fourth end of the third time period.

25. A method for a power converter, the method comprising:
receiving an input signal; and
outputting a drive signal to a switch to affect a current associated with a winding of the power converter, the drive signal being associated with the input signal;
wherein the outputting a drive signal to a switch to affect a current associated with a winding of the power converter includes:
detecting a first duration of a demagnetization period associated with the winding based at least in part on the input signal, the demagnetization period including a first beginning and a first end; and
determining a second duration of a time period for the drive signal based at least in part on the first duration, the time period including a second beginning and a second end, the second end being after the first end.

26. The method of claim 25 wherein the determining a second duration of a time period for the drive signal based at least in part on the first duration includes determining the second duration of the time period to be equal to the first duration multiplied by a predetermined coefficient, the predetermined coefficient being larger than 0 and smaller than 1.

27. The method of claim 25 wherein the second beginning is after the first end.

28. The method of claim 27 wherein the outputting a drive signal to a switch to affect a current associated with a winding of the power converter further includes keeping the drive signal at a first logic level from the second beginning to the second end and at a second logic level from the first end to the second beginning.

29. The method of claim 28 wherein:
the first logic level is a logic high level; and
the second logic level is a logic low level.

30. A method for a power converter, the method comprising:
receiving an input signal; and
outputting a first drive signal to a first switch to affect a first current associated with a first winding of the power converter, the first drive signal being associated with the input signal;
wherein the outputting a first drive signal to a first switch to affect a first current associated with a first winding of the power converter includes:
detecting a first duration of a first time period for a second drive signal, the second drive signal being outputted to a second switch to affect a second current associated with a second winding of the power converter, the first time period including a first beginning and a first end;
detecting a demagnetization duration of a demagnetization period associated with the first winding, the demagnetization period including a second beginning and a second end;
detecting a second duration of a second time period for the second drive signal, the second time period including a third beginning and a third end; and
determining a third duration of a third time period for the first drive signal based at least in part on the first duration, the demagnetization duration, and the second duration, the third time period including a fourth beginning and a fourth end, the fourth end being after the first end, the second end, and the third end;
wherein:
the second switch is closed from the first beginning to the first end;
the second switch is open from the first end to the third beginning; and
the second switch is closed from the third beginning to the third end.

31. The method of claim 30 wherein the determining a third duration of a third time period for the first drive signal based at least in part on the first duration, the demagnetization duration, and the second duration includes:
determining whether the first duration and the second duration satisfy one or more predetermined conditions; and
determining the third duration of the third time period based at least in part on whether the first duration and the second duration satisfy the one or more predetermined conditions.

32. The method of claim 31 wherein the determining whether the first duration and the second duration satisfy the one or more predetermined conditions includes, in response to the second duration minus the first duration being larger than a predetermined threshold, determine the first duration and the second duration satisfy the one or more predetermined conditions.

33. The method of claim 32 wherein the determining whether the first duration and the second duration satisfy the one or more predetermined conditions further includes, in response to the second duration minus the first duration being smaller than the predetermined threshold, determining the first duration and the second duration do not satisfy the one or more predetermined conditions.

34. The method of claim 33 wherein:
the determining the third duration of the third time period based at least in part on whether the first duration and the second duration satisfy the one or more predetermined conditions includes, in response to the first duration and the second duration being determined to satisfy the one or more predetermined conditions, determining the third duration to be equal to the demagnetization duration multiplied by a first predetermined coefficient;
wherein the first predetermined coefficient is larger than 0 and smaller than 1.

35. The method of claim 34 wherein:
the determining the third duration of the third time period based at least in part on whether the first duration and the second duration satisfy the one or more predetermined conditions further includes, in response to the first duration and the second duration being determined not to satisfy the one or more predetermined conditions, determining the third duration to be equal to the demagnetization duration multiplied by a second predetermined coefficient;
wherein:
the second predetermined coefficient is larger than 0 and smaller than 1; and
the second predetermined coefficient is not equal to the first predetermined coefficient.

36. The method of claim 35 wherein:
the predetermined threshold is larger than 0; and
the second predetermined coefficient is larger than the first predetermined coefficient.

37. The method of claim 36 wherein:
the first predetermined coefficient is larger than 0 and smaller than or equal to 0.5; and
the second predetermined coefficient is larger than 0.5 and smaller than 1.

38. The method of claim 30 wherein:
the first end is at the same time as the second beginning;
the second end is at the same time as the third beginning; and
the third end is at the same time as the fourth beginning.

39. The method of claim 30 wherein the outputting a first drive signal to a first switch to affect a first current associated with a first winding of the power converter includes keeping the first drive signal at a first logic level from the fourth beginning to the fourth end and at a second logic level from the second end to the fourth beginning.

40. The method of claim 39 wherein:
the first logic level is a logic high level; and
the second logic level is a logic low level.

* * * * *